United States Patent
Pellenq et al.

(10) Patent No.: US 11,512,022 B2
(45) Date of Patent: Nov. 29, 2022

(54) ELECTRON CONDUCTING CARBON-BASED CEMENT

(71) Applicants: Massachusetts Institute of Technology, Cambridge, MA (US); Centre National de la Recherche Scientifique, Paris (FR); Université de Bordeaux, Bordeaux (FR)

(72) Inventors: Roland J. M. Pellenq, Belmont, MA (US); Aikaterini Ioannidou, Cambridge, MA (US); Nicolas Chanut, Cambridge, MA (US); Thibaut Divoux, Cambridge, MA (US); Renal Backov, Boston, MA (US); Franz-Josef Ulm, Cambridge, MA (US)

(73) Assignees: MASSACHUSETTS INSTITUTE OF TECHNOLOGY, Cambridge, MA (US); CENTRE NATIONAL DE LA RECHERCHE SCIENTIFIQUE, Paris (FR); UNIVERSITÉ DE BORDEAUX, Bordeaux (FR)

( * ) Notice: Subject to any disclaimer, the term of this patent is extended or adjusted under 35 U.S.C. 154(b) by 0 days.

(21) Appl. No.: 17/113,745

(22) Filed: Dec. 7, 2020

(65) Prior Publication Data
US 2021/0276921 A1    Sep. 9, 2021

Related U.S. Application Data

(62) Division of application No. 16/245,752, filed on Jan. 11, 2019, now Pat. No. 10,875,809.

(Continued)

(51) Int. Cl.
*C04B 28/04* (2006.01)
*C04B 22/02* (2006.01)
(Continued)

(52) U.S. Cl.
CPC .............. *C04B 28/04* (2013.01); *C04B 22/02* (2013.01); *C04B 24/383* (2013.01); *H01G 11/08* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 4,363,667 A | * | 12/1982 | Birchall | .................. C04B 28/02 |
| | | | | 106/726 |
| 4,878,948 A | * | 11/1989 | Shah | ....................... C04B 28/02 |
| | | | | 524/4 |

(Continued)

FOREIGN PATENT DOCUMENTS

| | | | |
|---|---|---|---|
| JP | 2006273605 A | * | 10/2006 |
| MX | 2007012025 A | * | 3/2009 |
| WO | 2011/078901 A1 | | 6/2011 |

OTHER PUBLICATIONS

English machine translation of Araki et al. (JP 2006-273605 A) accessed online from IP.com; a PDF copy is attached. (Year: 2006).*

(Continued)

*Primary Examiner* — Katie L. Hammer
(74) *Attorney, Agent, or Firm* — Hamilton, Brook, Smith & Reynolds, P.C.

(57) ABSTRACT

A nanoporous carbon-loaded cement composite that conducts electricity. The nanoporous carbon-loaded cement composite can be used in a variety of different fields of use, including, for example, a structural super-capacitor as an energy solution for autonomous housing and other buildings, a heated cement for pavement deicing or house basement insulation against capillary rise, a protection of concrete against freeze-thaw (FT) or alkali silica reaction (ASR)

(Continued)

or other crystallization degradation processes, and as a conductive cable, wire or concrete trace.

19 Claims, 15 Drawing Sheets

Related U.S. Application Data

(60) Provisional application No. 62/616,693, filed on Jan. 12, 2018.

(51) Int. Cl.

| | |
|---|---|
| *C04B 24/38* | (2006.01) |
| *H01G 11/08* | (2013.01) |
| *H01G 11/36* | (2013.01) |
| *H01G 11/42* | (2013.01) |
| *H01G 11/52* | (2013.01) |
| *H01G 11/30* | (2013.01) |
| *C04B 14/06* | (2006.01) |
| *C04B 103/40* | (2006.01) |
| *C04B 111/00* | (2006.01) |
| *C04B 111/40* | (2006.01) |
| *C04B 111/94* | (2006.01) |

(52) U.S. Cl.
CPC ............ *H01G 11/36* (2013.01); *H01G 11/42* (2013.01); *H01G 11/52* (2013.01); *C04B 14/06* (2013.01); *C04B 2103/408* (2013.01); *C04B 2111/00008* (2013.01); *C04B 2111/00844* (2013.01); *C04B 2111/40* (2013.01); *C04B 2111/94* (2013.01); *H01G 11/30* (2013.01); *Y02E 60/13* (2013.01)

(56) References Cited

U.S. PATENT DOCUMENTS

| | | | | |
|---|---|---|---|---|
| 5,447,564 | A | * | 9/1995 | Xie ........................ C04B 28/02 106/644 |
| 5,489,574 | A | * | 2/1996 | Miano ..................... C09K 8/46 507/140 |
| 8,426,501 | B1 | | 4/2013 | Taha et al. |
| 10,875,809 | B2 | | 12/2020 | Pelleng et al. |
| 2001/0052307 | A1 | * | 12/2001 | Pye ........................ C04B 14/022 106/717 |
| 2008/0163794 | A1 | * | 7/2008 | Tanaka .................... C04B 14/48 106/705 |
| 2016/0340245 | A1 | | 11/2016 | Loh et al. |
| 2019/0218144 | A1 | | 7/2019 | Pellenq |

OTHER PUBLICATIONS

English machine translation of Cazares (MX 2007012025 A) accessed online from IP.com; a PDF copy is attached. (Year: 2007).*
Notification of Transmittal of the International Search Report and The Written Opinion of the International Searching Authority, or the Declaration, International Search Report and Written Opinion of the International Searching Authority for International Application No. PCT/US2019/013304, entitled: "Electron Conducting Carbon-Based Cement, Method of Making it and Supercapacitator", dated Mar. 14, 2019.
PCT International Preliminary Report on Patentability for International Application No. PCT/US2019/013304, entitled "Electron Conducting Carbon-Based Cement, Method of Making it and Supercapacitor," dated Jul. 14, 2020.
Han et al., "A self-sensing carbon nanotube/cement composite for traffic monitoring", Nanotechnology, IOP, vol. 20, No. 44, Nov. 4, 2009, pp. 1-5.
Keriene, et al. "The influence of multi-walled carbon nanotubes additive on properties of non-autoclaved and autoclaved aerated concretes", Construction and Building Materials, vol. 49, No. 23, Sep. 2013, pp. 527-535.
Yu et al., "A carbon nanotube/cement composite with piezoresistive properties," Smart Materials and Structures, vol. 18, No. 5, Mar. 30, 2009, 5 pages.
U.S. Notice of Allowance for U.S. Appl. No. 16/245,752, entitled "Electron Conducting Carbon-Based Cement," dated Aug. 26, 2020.
U.S. Corrected Notice of Allowance for U.S. Appl. No. 16/245,752, entitled "Electron Conducting Carbon-Based Dement," dated Oct. 21, 2020.

* cited by examiner

ELECTRON CONDUCTING CARBON-BASED CEMENT

RELATED APPLICATION

This application is a divisional of U.S. application Ser. No. 16/245,752, filed Jan. 11, 2019, which claims the benefit of U.S. Provisional Application No. 62/616,693, filed on Jan. 12, 2018. The entire teachings of the above applications are incorporated herein by reference.

BACKGROUND

On the one hand, there is no other material that can replace cement in the foreseeable future to meet our societies' needs for housing, shelter and infrastructure. Nevertheless, cement faces an uncertain future, due to a non-negligible ecological footprint that amounts to 5-10% of the worldwide $CO_2$ production. On the other hand, thanks to breakthroughs in science and engineering, cement has a novel potential to contribute to a sustainable development encompassing economic growth and social progress while minimizing the ecological footprint.

SUMMARY

In accordance with an embodiment of the invention, there is provided a nanoporous carbon-loaded cement composite that conducts electricity. The nanoporous carbon-loaded cement composite can be used in a variety of different possible fields of use, including, for example: a structural super-capacitor as an energy solution for autonomous housing and other buildings; a heated cement for pavement deicing or house basement insulation against capillary rise; a protection of concrete against freeze-thaw (FT) or alkali silica reaction (ASR) or other crystallization degradation processes; and as a conductive cable, wire or concrete trace.

In one embodiment according to the invention, there is provided an electrically conductive cement composite, comprising hydraulic cement, water, a carbon nanoparticle dispersing agent, and a continuous percolating network of nanoporous carbon nanoparticles.

In further, related embodiments, the electrically conductive cement composite may comprise between about 2% by weight and about 10% by weight of the nanoporous carbon nanoparticles with respect to a total initial mix comprising the hydraulic cement, the carbon nanoparticle dispersing agent, the water and the nanoporous carbon nanoparticles, and comprise a water to cement ratio between about 0.5 and about 0.8. The carbon nanoparticle dispersing agent may comprise carboxymethyl cellulose. The carboxymethyl cellulose may comprise between about 0.1% by weight and about 1% by weight of a total initial mix comprising the hydraulic cement, the carbon nanoparticle dispersing agent, the water and the nanoporous carbon nanoparticles. The nanoporous carbon nanoparticles may comprise a carbon material comprising a dominating population of carbon atoms engaged in $sp^2$-hybridization. The nanoporous carbon nanoparticles may comprise a pore size of less than about 1 nanometer. The nanoporous carbon nanoparticles may comprise at least one of: Vulcan carbon black, Ketjen carbon black, PBX carbon black and an activated porous carbon. The hydraulic cement may comprise Portland Cement. The electrically conductive cement composite may comprise between about 50% by weight and about 70% by weight of Portland Cement, such as about 60% by weight of Portland Cement, with respect to a total initial mix comprising the hydraulic cement, the carbon nanoparticle dispersing agent, the water and the nanoporous carbon nanoparticles. The electrically conductive cement composite may comprise an electrical resistivity of less than about 1000 ohm-meters, such as less than about 300 ohm-meters. The continuous percolating network of nanoporous carbon nanoparticles may substantially fill a capillary pore network of the electrically conductive cement composite, the capillary pore network comprising pores between about 5 nanometers and about 1 micron in size. The electrically conductive cement composite may comprise a greater than 90 percent connected percolating pore network that hosts the nanoporous carbon nanoparticles which form the continuous percolating network of nanoporous carbon nanoparticles. The nanoporous carbon nanoparticles may comprise a specific surface area less than about 3000 $m^2/g$, such as less than about 300 $m^2/g$. The electrically conductive cement composite may comprise between about 0.1% by weight and about 1% by weight of the carbon nanoparticle dispersing agent with respect to a total initial mix comprising the hydraulic cement, the carbon nanoparticle dispersing agent, the water and the nanoporous carbon nanoparticles.

In another embodiment according to the invention, there is provided an electrically conductive mortar, the mortar comprising fine aggregate and any of the electrically conductive cement composites taught herein.

In another embodiment according to the invention, there is provided an electrically conductive concrete, comprising sand, gravel aggregates, and any of the electrically conductive cement composites taught herein.

In a further embodiment according to the invention, there is provided a structural supercapacitor, comprising at least two conductors comprising any of the electrically conductive cement composites taught herein, separated by a dielectric porous medium permeable to electrolyte species.

In further related embodiments, the structural supercapacitor may comprise a structural element in a building. The dielectric porous medium may comprise a separator membrane comprising at least one of paper and Portland Cement. Each of the at least two conductors may comprise a sheet comprising the electrically conductive cement composite, the sheet being less than about 100 cm thick, such as less than about 10 cm thick. The structural supercapacitor may be in electrical connection with an energy source, such as at least one of a solar energy source, a wind power source, a biofuel energy source, a biomass energy source, a geothermal power source, a hydropower source, a tidal power source and a wave power source. The structural supercapacitor may be in electrical connection with a battery.

In a further embodiment according to the invention, there is provided a Joule effect heated monolith structure, the structure comprising any of the electrically conductive cement composites taught herein and at least two terminals configured to receive application of an electrical potential difference between the at least two terminals, thereby producing heating in the electrically conductive cement composite.

In further related embodiments, the heated monolith structure may comprise at least a portion of at least one of a home basement wall or floor, a pavement, a road, and an airport runway.

In another embodiment according to the invention, there is provided a concrete resistant to crystallization induced degradations, the concrete comprising an electrically conductive concrete comprising any of the electrically conductive cement composites taught herein and at least two terminals configured to receive application of an electrical potential difference between the at least two terminals.

In a further embodiment according to the invention, there is provided a conductive cable, wire or concrete trace comprising any of the electrically conductive cement composites taught herein.

In another embodiment according to the invention, there is provided a method of forming an electrically conductive cement composite, the method comprising mixing nanoporous carbon nanoparticles in an aqueous solution of a carbon nanoparticle dispersing agent thereby creating a nanoporous carbon nanoparticle suspension; and mixing a hydraulic cement powder with the nanoporous carbon nanoparticle suspension.

In further, related embodiments, the method may further comprise casting the electrically conductive cement composite and immersing the electrically conductive cement composite in a solution comprising lime and water. The method may further comprise forming a composite comprising between about 2% by weight and about 10% by weight of the nanoporous carbon nanoparticles with respect to a total initial mix comprising the hydraulic cement, the carbon nanoparticle dispersing agent, the water and the nanoporous carbon nanoparticles, and comprising a water to cement ratio between about 0.5 and about 0.8. The carbon nanoparticle dispersing agent may comprise carboxymethyl cellulose. The carboxymethyl cellulose may comprise between about 0.1% by weight and about 1% by weight of a total initial mix comprising the hydraulic cement, the carbon nanoparticle dispersing agent, the water and the nanoporous carbon nanoparticles. The nanoporous carbon nanoparticles may comprise a pore size of less than about 1 nanometer. The nanoporous carbon nanoparticles may comprise at least one of Vulcan carbon black, Ketjen carbon black, PBX carbon black and an activated porous carbon. The hydraulic cement may comprise Portland Cement. The electrically conductive cement composite may comprise between about 50% by weight and about 70% by weight of Portland Cement with respect to a total initial mix comprising the hydraulic cement, the carbon nanoparticle dispersing agent, the water and the nanoporous carbon nanoparticles. The nanoporous carbon nanoparticles may comprise a specific surface area less than about 3000 $m^2/g$, such as a specific surface area less than about 300 $m^2/g$.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 4A shows Hardness (H), Indentation modulus (M) and creep modulus (C) of cement sample vs. the content in dimetoxycarboxy cellulose. FIG. 4(B) shows the same series of graphs for cement samples versus various degrees of content of Vulcan nanoparticles.

DETAILED DESCRIPTION

Figure 1:
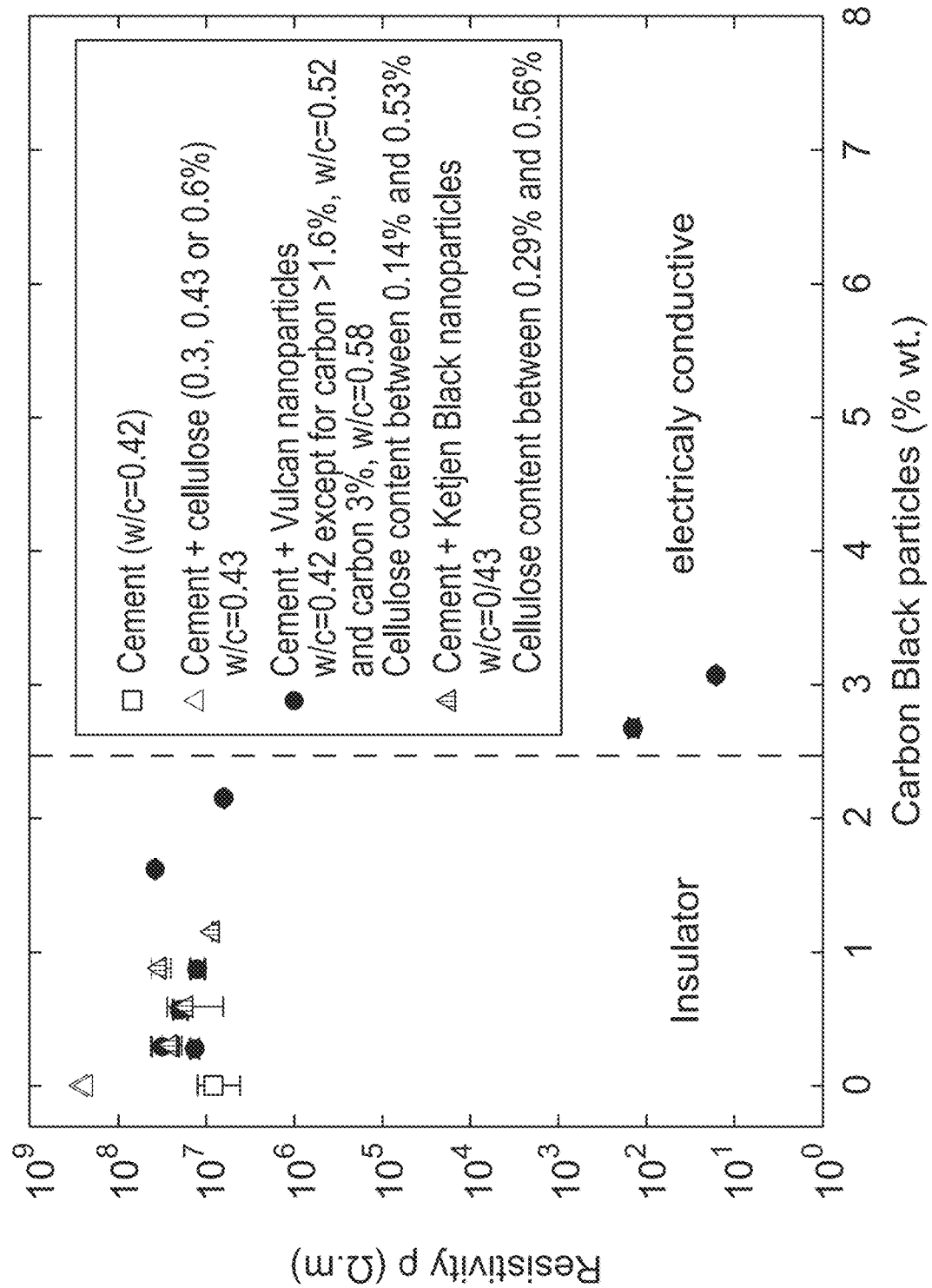
FIG. 1 is a graph of resistivity (ρ) of various cement samples (pure, loaded with cellulose or loaded with cellulose and porous carbon nanoparticles, either Vulcan or Ketjenblack) in an experiment in accordance with an embodiment of the invention.

A description of example embodiments follows.

Embodiments of the invention are based on the discovery of a nanoporous carbon loaded cement paste composite that conducts electricity. The nanoporous carbon-loaded cement composite can be used in a variety of different possible fields of use, including, for example: a structural super-capacitor as an energy solution for autonomous housing and other buildings; a heated cement for pavement deicing or house basement insulation against capillary rise; a protection of concrete against freeze-thaw (FT) or alkali silica reaction (ASR) or other crystallization degradation processes; and as a conductive cable, wire or concrete trace.

As used herein and in the accompanying claims, "hydraulic cement" is a cement that sets in the presence of water and forms a water-resistant product. Examples include Portland cement, Portland cement blends, and calcium sulfoaluminate cements.

As used herein and in the accompanying claims, "Portland cement" is defined in accordance with ASTM Standard C150, the entire teachings of which are hereby incorporated herein by reference. More particularly "Portland cement" as used herein and in the accompanying claims refers to hydraulic cement (cement that not only hardens by reacting with water but also forms a water-resistant product) produced by pulverizing clinkers which consist essentially of hydraulic calcium silicates, usually containing one or more of the forms of calcium sulphate as an inter ground addition.

As used herein and in the accompanying claims, a "carbon nanoparticle dispersing agent" is an agent that disperses a carbon phase including carbon nanoparticles, in water. For example, carboxymethyl cellulose or a cellulose based polymer can be used.

In accordance with an embodiment of the invention, the nanoporous carbon phase can be any of the carbon material family with a dominating population of carbon atoms engaged in an $sp^2$ hybridization scheme, with examples given below.

As used herein and in the accompanying claims, a "continuous percolating network of nanoporous carbon nanoparticles" within a cement composite is a network formed by continuous connection of carbon nanoparticles that have percolated a capillary pore network of the cement to a sufficient degree to make the cement composite electrically conductive. The continuous percolating network of nanoporous carbon nanoparticles can, but need not, substantially or completely fill the porosity of the capillary pore network of the cement. A capillary pore network within a cement composite can, for example, include pores between about 5 nanometers and about 1 micron in size.

As will be described further in connection with experiments in accordance with an embodiment of the present invention, it has been found that, in order to disperse a carbon phase including carbon nanoparticles, in water, a small amount (for example, between about 0.1% by weight and about 1% in weight compared to the initial total mix) of a carbon nanoparticle dispersing agent such as Carboxy-Methyl Cellulose (CMC) can be used. This solution is then mixed with Ordinary Portland Cement (OPC) in the proportion of, for example, about 60% of OPC in weight. It will be appreciated that other proportions can be used, such as between about 50% of OPC and about 70% of OPC by weight. The sample is then, for example, stored during a week in a CaO solution for maturation. In experiments in accordance with an embodiment of the invention, described in more detail below, measurements are made after a setting time of 3 weeks. In the experiments, we determine (i) the electrical conductivity (ii) composite porosity through BET measurements, (iii) the mechanical properties (Hardness, Indentation modulus and creep modulus), and (iv) electrical capacitance. These quantities are measured as a function of the amount of nanoporous carbons added to the sample. We have tested various nanoporous carbons, namely Vulcan carbon black particles (specific surface area 214 $m^2/g$, particle size 30 nm), Ketjen black particles (specific surface area 932 $m^2/g$, particle size 30 nm), multiwall carbon nanotubes (MWCN, length of several microns, diameter 300 nm) and graphene flakes (size 30 nm). Other nanoporous carbon nanoparticles can be used, such as activated porous carbons, for example AX-21, saccharose cokes and others.

As a proof of concept, it has been determined in accordance with an embodiment of the invention that the electrical resistivity of a standard cement can be decreased, for example, from $10^7$ Ωm down to 150 Ωm by adding Vulcan nanoporous carbon at 2.7% in weight of the total mix. Such effect results from a percolated network of porous carbon particles. Indeed, low temperature Nitrogen adsorption/desorption experiments reveal that electron conductivity is achieved when the so-called capillary pores network of the cement paste (extending from 5 nm to micron size in pore sizes) is partially filled with carbon nanoparticles. Moreover, preliminary X-ray tomography imaging experiments (64 nm resolution) reveal that this capillary porosity in cement paste constitute a greater than 90% connected percolating pore network.

Without wishing to be bound by theory, it is believed that having a continuous network of nanoporous carbon particles percolating the entire cement paste is therefore a useful element to achieve an electron conductive cement paste. It is due to the fundamental de-mixing between organic and setting inorganic phases formed during cement hydration process.

Furthermore contrarily to iron or copper, there should be no oxidization processes; therefore, the electrical conductivity should not be altered over time.

In one embodiment according to the invention, an electrically conductive cement composite includes hydraulic cement, water, a carbon nanoparticle dispersing agent, and a continuous percolating network of nanoporous carbon nanoparticles. The electrically conductive cement composite can include between about 2% by weight and about 10% by weight of the nanoporous carbon nanoparticles with respect to a total initial mix comprising the hydraulic cement, the carbon nanoparticle dispersing agent, the water and the nanoporous carbon nanoparticles, and can comprise a water to cement ratio between about 0.5 and about 0.8. The carbon nanoparticle dispersing agent can include carboxymethyl cellulose, which can include between about 0.1% by weight and about 1% by weight of a total initial mix comprising the hydraulic cement, the carbon nanoparticle dispersing agent, the water and the nanoporous carbon nanoparticles. In another example, a cellulose based polymer can be used as a carbon nanoparticle dispersing agent. The nanoporous carbon nanoparticles can include at least one of: Vulcan carbon black, Ketjen carbon black, PBX carbon black and an activated porous carbon, such as AX-21 or a saccharose coke; and can include a pore size of less than about 1 nanometer. The PBX carbon black can, for example, be PBX® 55 carbon black, sold by Cabot Corporation of Boston, Mass., U.S.A. The hydraulic cement can include Portland Cement; and the electrically conductive cement composite can include between about 50% by weight and about 70% by weight of Portland Cement, such as about 60% by weight of Portland Cement, with respect to a total initial mix comprising the hydraulic cement, the carbon nanoparticle dispersing agent, the water and the nanoporous carbon nanoparticles. The electrically conductive cement composite can include an electrical resistivity of less than about 1000 ohm-meters, such as less than about 300 ohm-meters. The continuous percolating network of nanoporous carbon nanoparticles can substantially fill a capillary pore network of the electrically conductive cement composite. The capillary pore network can include pores between about 5 nanometers and about 1 micron in size. The electrically conductive cement composite can comprise a greater than 90 percent connected percolating pore network that hosts the nanoporous carbon nanoparticles which form the continuous percolating network of nanoporous carbon nanoparticles. The nanoporous carbon nanoparticles can have a specific surface area less than about 3000 $m^2/g$, such as less than about 300 $m^2/g$. The electrically conductive cement composite can include between about 0.1% by weight and about 1% by weight of the carbon nanoparticle dispersing agent with respect to a total initial mix comprising the hydraulic cement, the carbon nanoparticle dispersing agent, the water and the nanoporous carbon nanoparticles. An electrically conductive mortar can be made, that includes fine aggregate and any of the electrically conductive cement composites taught herein. An electrically conductive concrete can also be made, that includes sand, gravel aggregates, and any of the electrically conductive cement composites taught herein.

Several fields of application of electrically conductive cement composites in accordance with an embodiment of the invention are described below.

1. Structural Super-Capacitor as an Energy Solution for Autonomous Housing

Context: On the one hand, there is no other material that can replace cement in the foreseeable future to meet our societies' needs for housing, shelter and infrastructure. Nevertheless, cement faces an uncertain future, due to a non-negligible ecological footprint that amounts to 5-10% of the worldwide $CO_2$ production. On the other hand, thanks to breakthroughs in science and engineering, cement has a novel potential to contribute to a sustainable development encompassing economic growth, social progress while minimizing on the ecological footprint, if besides mechanical strength, new energy-storage functionalities were added to structural elements (beams, slabs) in a building.

Field of Application: In accordance with an embodiment of the invention, the functionality of cement paste is optimized towards electrical energy storage using our electron nanoporous/nanoparticle carbon-loaded conductive cement paste assembled in a gigantic structural supercapacitor.

Thus, in a further embodiment according to the invention, there is provided a structural supercapacitor, which can be a structural element in a building, and that includes at least two conductors comprising any of the electrically conductive cement composites taught herein, separated by a dielectric porous medium permeable to electrolyte species. The dielectric porous medium can include a separator membrane that includes at least one of paper and Portland Cement. Each of the at least two conductors can include a sheet comprising the electrically conductive cement composite, and the sheet can, for example, be less than about 100 cm thick, such as less than about 10 cm thick. The structural supercapacitor can be in electrical connection with an energy source, such as at least one of a solar energy source, a wind power source, a biofuel energy source, a biomass energy source, a geothermal power source, a hydropower source, a tidal power source and a wave power source. The structural supercapacitor can be in electrical connection with a battery.

2. Joule Effect for Pavement Deicing/House Basement Insulation Against Capillary Rise Context: It is of practical interest of addressing high conductive cement where the conductivity through a joule effect increases the monolith cement temperature due to the electronic transport. Several applications of first importance can be designed to eliminate wall capillary rise of home basements and icing layers on pavement, roads or airport runways in cold temperature weather.

Field of application: Considering the cement heat capacity (1.55 kJ $kg^{-1}$ $K^{-1}$), one may argue that beyond being an electronic insulator, pristine cement is also a heat insulator and it is not worth dispersing heat conductor within an insulator continuous phase, as the insulating property will dominate the whole behavior, even if considering sp2 type carbon particles bearing heat capacity around 700 J $K^{-1}$ $kg^{-1}$. This no longer holds if the carbonaceous dispersion is percolated within the cement phase such as in electrically conductive cement composite design. If the carbon phase is percolated, both the electronic and heat transport will be strongly enhanced, scenario where the dispersed phase will now completely dominate the cement/carbon composite materials properties. As such we may consider that the carbonaceous percolated continuous phase will act as "heating highways," due its intrinsic high heat capacity, and thus propagates the heat at ease along the whole monolith. Furthermore, the carbon particles, contradictory to iron or copper, should not be oxidized, thereby its intrinsic conductivity should not be modifying neither with time, nor with the winter weather conditions.

A preliminary experiment applying a potential difference of 30 V under 0.1 A between the two sides of an electrically conductive cement composite $cm^3$ electrode shows a rise in temperature of 5° C. in a few seconds. An embodiment thereby provides the Joule effect in a Carbon-Cement-Composite.

Thus, in an embodiment according to the invention, there is provided a Joule effect heated monolith structure, which includes any of the electrically conductive cement composites taught herein and at least two terminals configured to receive application of an electrical potential difference between the at least two terminals, thereby producing heating in the electrically conductive cement composite. The heated monolith structure can include at least a portion of at least one of a home basement wall or floor, a pavement, a road, and an airport runway.

3. Protection of Concrete Against Freeze-Thaw (FT)/Alkali Silica Reaction (ASR) Degradation Processes Context for FT: Freeze-thaw damage lies in the scope of the broad field of Crystallization in a porous medium. More specifically, it is due to drop of temperature in winter weather conditions. It leads to concrete cracking. The conditions for FT damage to occur are a water saturation of the cement pore network (at least of 80%) and the presence of ions of these pores (pristine ions plus deicing salts). It is known that damages concentrate at the joint between pavement slabs where deicing salt ions accumulate. The usual idea to explain FT degradation of concrete is that it is due to ice growth inside the capillary pores at high water degree of saturation; ice occupying a larger volume than liquid water. However, it has become clear that (i) the interface between ice and the cement paste is an electrolytic liquid nano-layer (ii) in this nanometric liquid layer, an ionic disjoining pressure can develop between the ice core and the cement paste providing that the temperature is low enough (−8 C) for the ice to stand this pressure (otherwise it melts ice into liquid water, the liquidus line of the water phase diagram being of negative slope).

Context for ASR: The mechanism by which the ASR gel is formed requires a high-pH solution, the presence of alkali ions, of $Ca^{2+}$ ions and plenty of $OH^-$. For a long time, it was believed that the ASR gel (i) was a very hard material (~0.5 stiffness of C—S—H), that can exert considerable pressure on C—S—H since it takes 10-20% more volume than the aggregate grains that it dissolves as a largely incompressible fluid that can flow in the aggregate-cement paste interfacial transition zone (ii) The gel initially has a low-calcium content, and flows out without creating damage. It calcifies in the cement paste. It was suggested that this calcified gel layer is semi-permeable: it lets alkali ions, OH⁻ and water flow, but does not let gel escape. The ASR reaction continues, with the additional gel produced confined by the calcified reaction rim. This leads to a buildup of expansive pressure. More recently, it was shown by CSHub@MIT, that the gel flows into the cement paste and it exchanges ions with the nearby cement paste. Notably, the cement paste can intake alkali ions (and loses $Ca^{2+}$ions), which leads to the expansion of the cement paste nanograins themselves. However cement paste can take a rather limited amount of alkali ions (2%), leaving the vast majority of alkali species in the capillary cement paste pores solution as the ASR gel flows from the aggregates into the cement paste. The gel surface is electrically neutral, while that of cement paste surface is charged. The interaction of the ion-rich wetting layer in-between a charged surface and a neutral surface leads to substantial electrostatic disjoining pressure. If the gel is not stiff enough, i.e. has a low calcium content, this pressure makes it flow into other pores. If the gel gets stiff, i.e. calcified, it can withstand this pressure and is then transmitted through the whole concrete structure. Molecular dynamics simulations carried out at the CSHub@MIT shows that this disjoining pressure due to alkali ions in the liquid layer between the ASR gel and the cement paste can reach over 50 MPa. Portlandite, the other product of cement hydration (dissolution/precipitation reaction) is probably the main calcifying agent of the ASR gel.

Field of Application, to prevent both FT and AST or any other crystallization induced degradations of concrete: In accordance with an embodiment of the invention, it is now understood that if one could make the capillary pores of a cement paste hydrophobic then there will be wetting layer induced ionic disjoining pressure. The nano carbon grains used to design the electrically conductive cement composite material in accordance with an embodiment of the invention, are essentially hydrophobic hence will repel water entering the capillary pore of cement paste. Furthermore, upon electrical polarization as for the other embodiments described above, the electrically conductive cement composite material will store alkali ions. Therefore, structural elements made the electrically conductive cement composite material would be not sensitive to FT and/or ASR damages any longer.

The above embodiment thereby can produce Damage-Free Concrete, or at least a concrete resistant to crystallization induced degradations. Such concrete includes an electrically conductive concrete comprising any of the electrically conductive cement composites taught herein and at least two terminals configured to receive application of an electrical potential difference between the at least two terminals.

In another embodiment according to the invention, a conductive cable, wire or concrete trace can include any of the electrically conductive cement composites taught herein.

In another embodiment according to the invention, there is provided a method of forming an electrically conductive cement composite. The method includes mixing nanoporous carbon nanoparticles in an aqueous solution of a carbon nanoparticle dispersing agent, thereby creating a nanoporous carbon nanoparticle suspension, and mixing a hydraulic cement powder with the nanoporous carbon nanoparticle suspension. The method can include casting the electrically conductive cement composite and immersing the electrically conductive cement composite in a solution comprising lime and water. The method can include forming a composite comprising between about 2% by weight and about 10% by weight of the nanoporous carbon nanoparticles with respect to a total initial mix comprising the hydraulic cement, the carbon nanoparticle dispersing agent, the water and the nanoporous carbon nanoparticles, and comprising a water to cement ratio between about 0.5 and about 0.8. The carbon nanoparticle dispersing agent can include carboxymethyl cellulose, which can be between about 0.1% by weight and about 1% by weight of a total initial mix comprising the hydraulic cement, the carbon nanoparticle dispersing agent, the water and the nanoporous carbon nanoparticles. The nanoporous carbon nanoparticles can have a pore size of less than about 1 nanometer; and can be at least one of Vulcan carbon black, Ketjen carbon black, PBX carbon black and an activated porous carbon, such as AX-21 or a saccharose coke. The hydraulic cement can include Portland Cement. The electrically conductive cement composite can include between about 50% by weight and about 70% by weight of Portland Cement, such as about 60% by weight of Portland Cement, with respect to a total initial mix comprising the hydraulic cement, the carbon nanoparticle dispersing agent, the water and the nanoporous carbon nanoparticles. The nanoporous carbon nanoparticles can have a specific surface area less than about 3000 $m^2/g$, such as a specific surface area less than about 300 $m^2/g$.

Below we describe experiments conducted in accordance with an embodiment of the invention:

EXPERIMENTAL

Sample Preparation

Cement samples loaded with carbon nanoparticles are prepared by mixing porous carbon nanoparticles (CABOT) in an aqueous solution of dimetoxycarboxy cellulose (Sigma Aldrich), which allows for dispersing and solubilizing these hydrophobic and porous nanoparticles over a typical duration of about 24 h. Cement powder is then added to the suspension and the sample is immediately mixed in a beaker @1200 rpm for about 90 s. The cement paste is then cast into a polycarbonate mold sealed with parafilm at both ends before being immersed in a lime/water solution for setting. After a week, the cement samples are solid and de-molded with a mechanic press and cut with a low-speed rotating saw in wet conditions (with the lime solution) into 6 to 7 cylinders (typical diameter 2 r=22.5 mm, and height e=10 mm). The cylinders are stored a constant temperature, before being used for further testing: electrical (conductivity measurements), structural (nitrogen physisorption, energy dispersive X-ray spectrometry and Raman spectroscopy) and mechanical (micro-indentation). Note that reference samples made of either pure cement, or cement and cellulose, are prepared following the same steps described above using respectively distilled water or aqueous solution of dimetoxycarboxy cellulose.

Electrical Properties:

Reference samples, i.e., pure cement samples and cement samples containing dimetoxycarboxy cellulose both behave as electrical insulator ($\rho \approx 10^7$ Ωm). Same goes for cement samples containing less than 2.3% wt. of carbon nanoparticles (either Vulcan or Ketjenblack or PBX). However, cement samples containing more than about 2.3% wt. of Vulcan nanoparticles show a significantly lower resistivity ($\rho \approx 10^2$ Ωm), by about 5 orders of magnitude, which proves that these carbon loaded samples are electrically conductive. The transition between insulator and conductor occurs in a narrow range of concentrations in carbon nanoparticles, at about 2.3% wt., which points towards the existence of a percolation threshold. Above 2.3% wt., the Vulcan nanoparticles form a percolated network than spans over the entire cement sample. This carbon backbone is responsible for the electrical conductive properties observed macroscopically. Finally, it is worth noting that Ketjenblack nanoparticles tend to aggregate, which makes it impossible to disperse to pass the percolation threshold, even with cellulose content up to 0.56% wt.

FIG. 1—Resistivity $\rho$ of various cement samples: pure, loaded with cellulose or loaded with cellulose and porous carbon nanoparticles: either Vulcan (VXC72R, CABOT) or Ketjenblack (CABOT) or PBX. The electrical resistivity p is measured on cement samples of cylindrical shape: typical diameter 2 r=22.5 mm and thickness e=10 mm. Samples are sandwiched between two copper electrodes connected to a high precision potentiostat (Solartron SI1287) that allows imposing a decreasing ramp of voltage from 10V to 0V, while recording the current passing through the sample. The voltage/current ratio is measured to be roughly constant and averaged to estimate the sample resistance R, which is then converted into the sample resistivity $\rho$ using the following equation: $\rho = R \times \pi r^2 / e$. Note that the water to cement ratio varies from 0.42 to 0.58 and that the samples electrically conductive contain 0.5% wt. of cellulose.

Distribution of Porous Carbon Particles in the Cement Matrix:

To test whether the carbon nanoparticles are homogeneously distributed in the cement matrix, we have performed Raman spectroscopy experiments at the surface of an electrically conductive cement sample loaded with 2.7% wt. of Vulcan nanoparticles and 0.5% wt. of dimetoxycarboxy cellulose. The sample is polished with a sequence of SiC papers of decreasing abrasiveness before being fixed on a metallic stub with cyanoacrylate glue. The sample surface is imaged using a correlative SEM/EDS Raman Microscope with a laser beam at 538 nm. A typical SEM picture of the sample surface is reported in FIG. 2A, while a Raman map of the carbon element, determined in a sub-region at the center of the SEM picture, is shown in FIG. 2B. The carbon nanoparticles appear homogeneously dispersed at a scale of 10 μm, which supports the claim of a percolated carbon network embedded into the cement matrix.

Figure 2A:
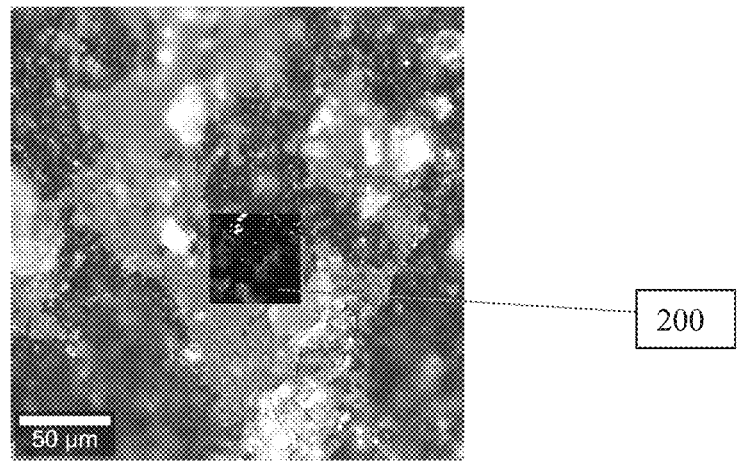
FIG. 2A is a Scanning Electron Micrograph (SEM) image of a sample surface.
Figure 2B:
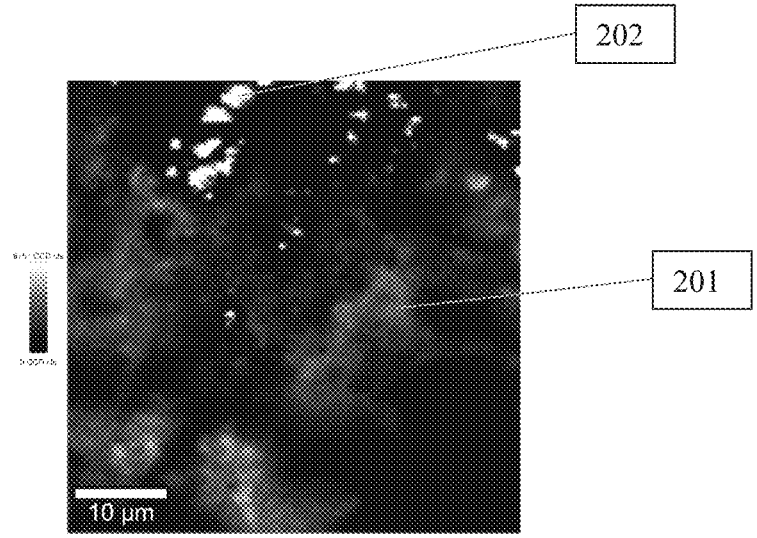
FIG. 2B is a Raman map of carbon, determined in a sub-region at the center of the SEM image of FIG. 2A, in an experiment to determine whether carbon nanoparticles are homogeneously distributed in the cement matrix.

FIG. 2A: SEM image of the top surface of an electrically conductive cement sample containing 2.7% wt. of Vulcan nanoparticles and 0.5% wt. of dimetoxycarboxy cellulose. FIG. 2B: Raman map of the carbon element in the central sub-region 200 of the SEM picture. The red regions 201 correspond to the area with carbon elements. Yellow spots 202 are artefacts due to fluorescence and should be ignored.

Location of the Carbon Nanoparticles within the Porosity of the Cement Matrix:

To characterize the porosity of the cement samples, we have performed physisorption experiments of azote at 77 K. BET surface area (FIG. 3A) and pore size distribution (FIG. 3B) have been determined using the Brunauer-Emmett-Teller (BET) method (1) and the Barrett-Joyner-Halenda (BJH) method (2) on the desorption branch respectively. The specific surface area of the cement sample increases with the content in carbon nanoparticles, since the nanoparticles are porous and show a much larger surface area (240 $m^2.g^{-1}$) than the cement matrix (35 $m^2.g^{-1}$).

Figure 3B:
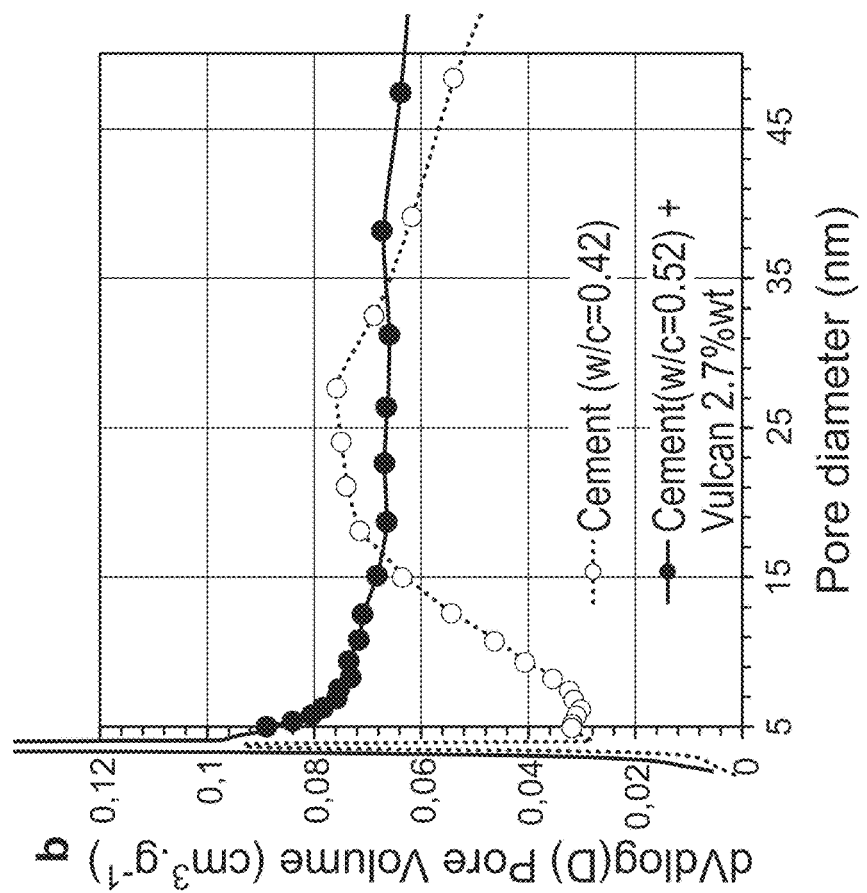
FIGS. 3A and 3B are images of results from an experiment to characterize the porosity of cement samples in accordance with an embodiment of the invention, in which there were performed physisorption experiments of azote at 77 K, with BET surface area (FIG. 3A) and pore size distribution (FIG. 3B) being determined using the Brunauer-Emmett-Teller (BET) method (1) and the Barrett-Joyner-Halenda (BJH) method (2) on the desorption branch respectively.
Figure 3A:
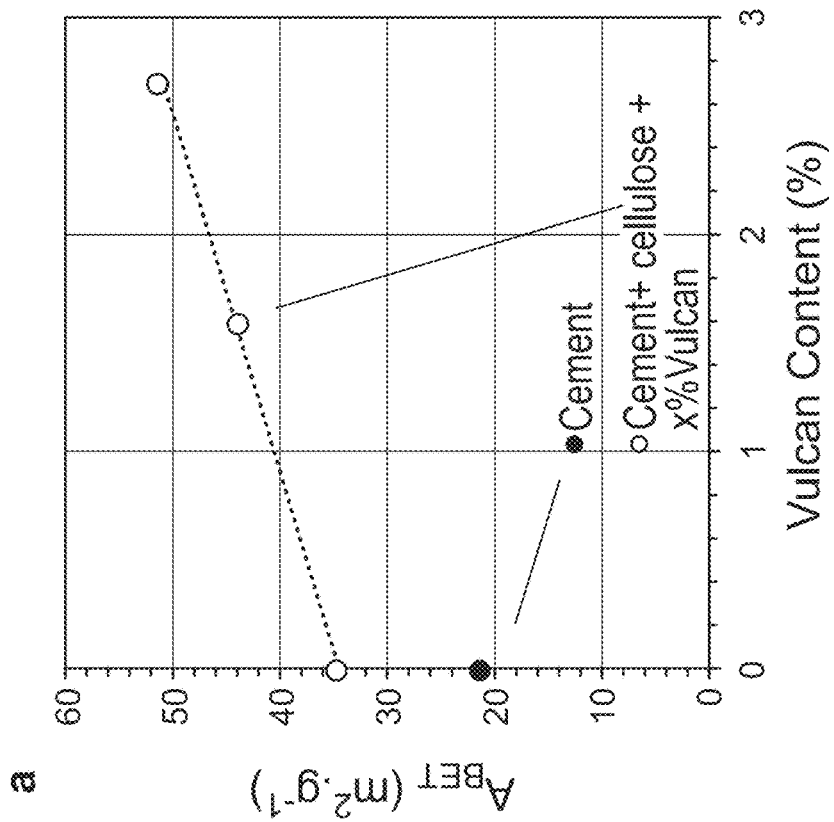

FIG. 3A: BET surface area vs the content in carbon nanoparticles. The presence of cellulose in a cement sample increases the BET surface area. Moreover, the addition of carbon further increases the BET surface area, proportionally to the amount of Vulcan nanoparticles. Indeed, the carbon nanoparticles are porous and present a larger BET surface area (surface area of 240 $m^2.g^{-1}$—measured performed independently) than the cement containing cellulose only (surface area of 35 $m^2.g^{-1}$). FIG. 3B: Pore size distribution of a pure cement sample and of a cement sample that is electrically conductive, i.e. containing 2.7% wt. of Vulcan nanoparticles and 0.5% wt. of dimetoxycarboxy cellulose. The conductive cement sample shows a larger amount of narrow pores (<15 nm) and a lower amount of larger pores (range 15 to 35 nm) than the pure cement. This result strongly suggests that the carbon nanoparticles fill the larger pores of the cement matrix, therefore increasing the number of narrow pores in the sample.

Mechanical Properties of Cement Samples:

The hardness (H), indentation modulus (M) and creep modulus (C) of cement samples were determined using statistical micro-indentation (micro-combi, Anton Paar). Each sample is polished with a sequence of SiC papers of decreasing abrasiveness, before being fixed on a metallic stub and stored at 60° C. for 24 h prior to testing. The micro-indenter consists in a three-sided pyramid-like Berkovich diamond tip. The sample is indented over a square grid of 15×15=225 indents, separated by 300 μm each. Each indent is performed in a force-controlled mode, which corresponds to a typical indentation depth of 20 to 30 μm. The load profile is the following: the force is increased linearly at a fixed rate of about 14 mN/min until the desired load of 3 N is reached. The load is then maintained constant at the corresponding value for 180 s, before being ramped back down to zero at the same rate. The indentation modulus and the hardness are computed from the raw curves following the method of Oliver and Pharr. (3), (4). Finally, the creep modulus of the samples was determined in analogy to the method proposed in reference (5), by fitting the creep phase indentation depth vs. time curve using a logarithmic function. The results for the reference cement samples are reported in FIG. 4A, and the results for the cement containing Vulcan nanoparticles are reported in FIG. 4B. In brief the mechanical properties of the cement samples are neither affected by the addition of cellulose, not by the addition of Vulcan carbon nanoparticles. The decrease in the mechanical properties above 1% wt. in particle content (FIG. 4B) is due to the increase in the water to cement ratio—see below caption of FIGS. 4A and 4B for details.

Figure 4A:
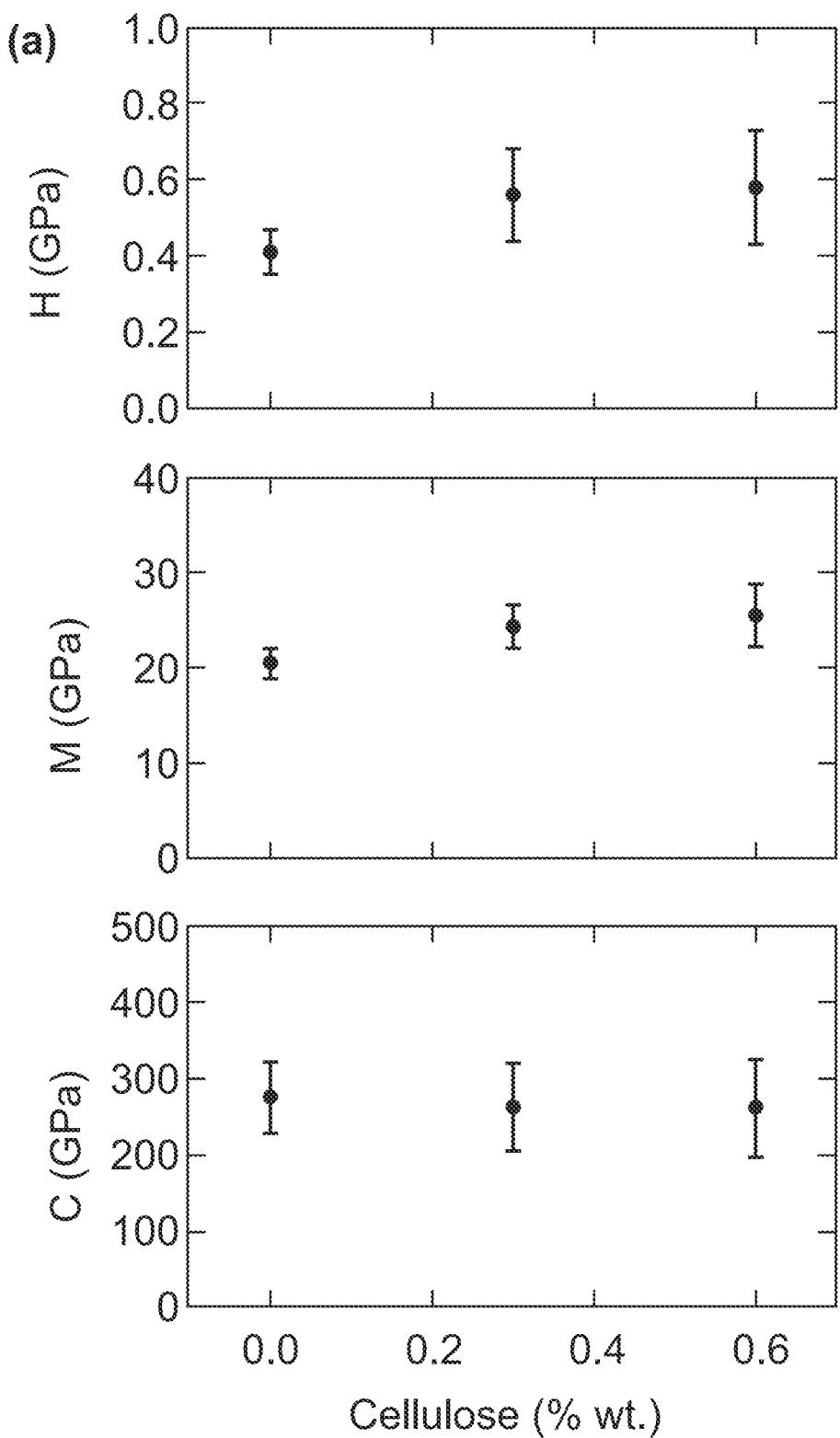
FIGS. 4A and 4B are images of results from experiments to characterize Hardness, Indentation modulus and creep modulus of samples in accordance with an embodiment of the invention.
Figure 4B:
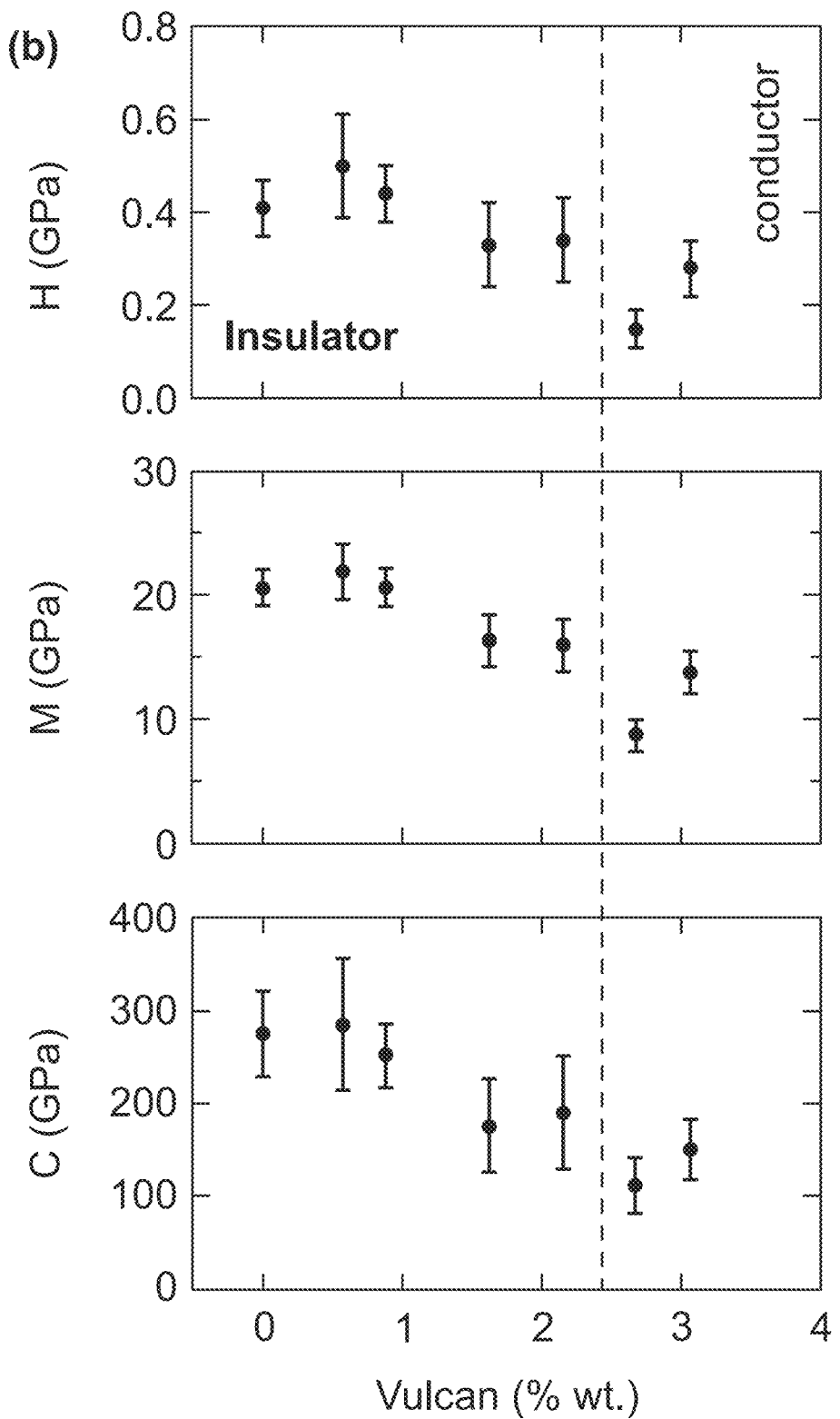

FIG. 4A: Hardness (H), Indentation modulus (M) and creep modulus (C) of cement sample vs the content in dimetoxycarboxy cellulose. Samples prepared with a water to cement ratio w/c=0.42. Tests performed on samples after 45 days. The addition of cellulose up to 0.6% wt. does not impact the mechanical properties of cement samples. FIG. 4B: same series of graphs for cement samples vs various content in Vulcan nanoparticles. Samples content in dimetoxycarboxy cellulose varies from 0.16 to 0.51. The water to cement ratio depends on the Vulcan content: w/c=0.43 for Vulcan content <1% wt., w/c=0.52 for Vulcan content ranging between 1.6% wt. and 2.7% wt., and w/c=0.58 for Vulcan content of 3.1% wt. The change in mechanical properties around 1% wt. in Vulcan content is not related to the presence of carbon nanoparticles but results directly from the increase of the water to cement ratio from 0.43 to 0.52. No changes in the mechanical properties are observed beyond the percolation threshold at about 2.3% wt. in Vulcan nanoparticles. Tests were performed on samples of age ranging between 26 and 45 days. In both (a) and (b), each point results from the average of at least 150 indentation tests and error bars stands for the standard deviation. The content in both cellulose and Vulcan nanoparticles is expressed as a percentage of the total weight content.

Further Experiment #1: Synthetic Procedures of Nanocomposite Cements

Figure 5:
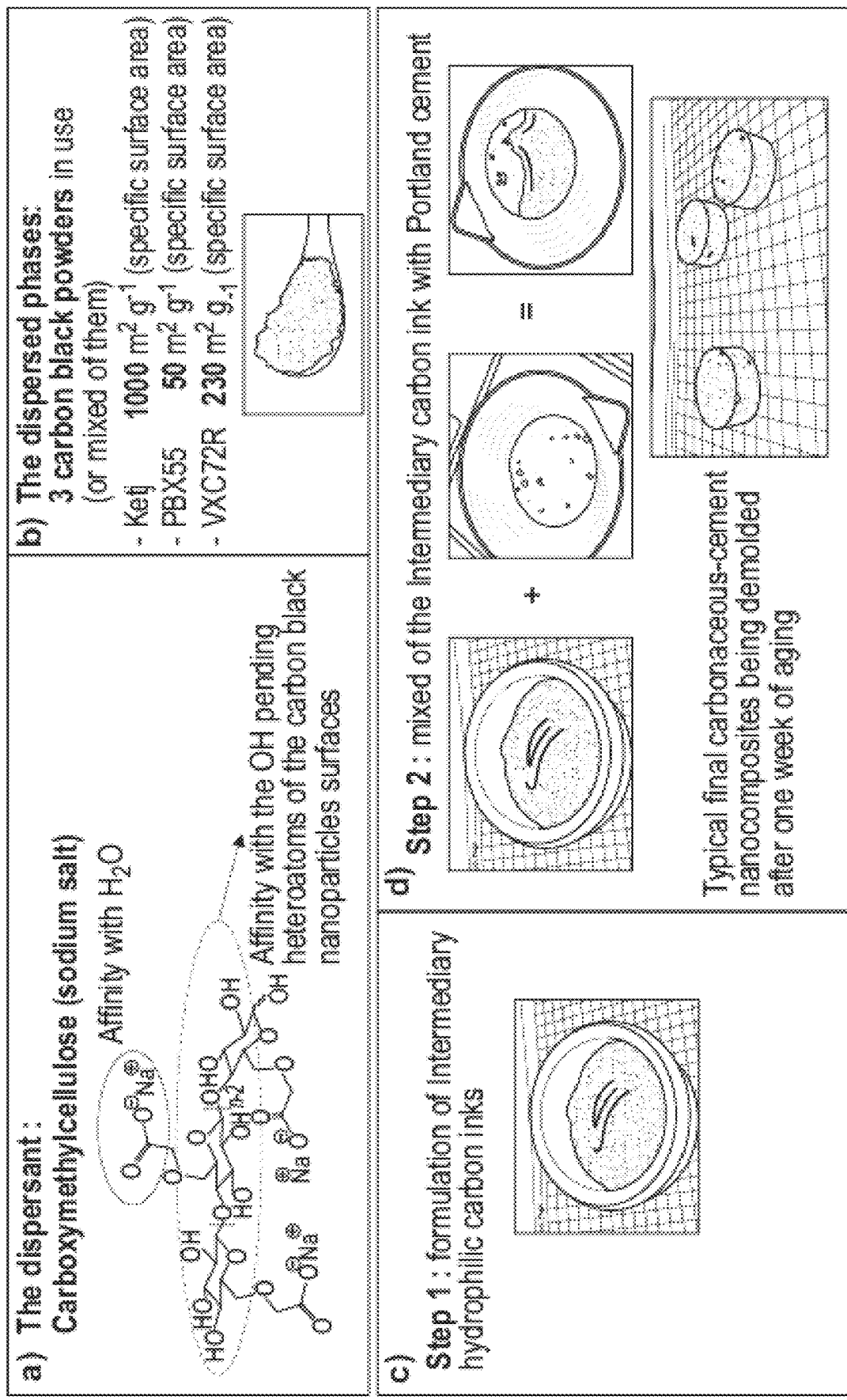
FIG. 5 shows an overall procedure used in an experiment in accordance with an embodiment of the invention, in which carboxymetylcellulose helps to disperse large quantities of hydrophobic carbon black nanoparticles in water.

In a further experiment in accordance with an embodiment of the invention, conductive cement samples are obtained through the dispersion of hydrophobic carbon black nanoparticles into a cement hydrophilic media. Carboxymetylcellulose helps to disperse large quantities of the hydrophobic carbon black nanoparticles in water. The overall procedure is depicted in FIG. 5. The dispersant used is the carboxymethylcellulose and was purchased from Aldrich and employed without purification (CAS number 9009-32-4). b) Three nanoporous carbon were employed while being kindly provided by Cabot. c) The carboxymethyl cellulose is first dissolved into deionized water under stirring, upon its complete dissolution (typically 6-8 hours) the carbon powders are then introduced in whole. The native dispersion is let under stirring during (3 days). A macroscopic homogenization is performed with a spatula after 24 and 48 hours in order to help the supernatant carbon powder of being both entrapped into the native ink and well dispersed. It is not necessary of employing ultrasonic devices to foster the dispersion process. At the end of the dispersion process, homogeneous and shiny hydrophilic carbonaceous inks are obtained. d) to generate final carbonaceous-cement nanocomposites the native inks are introduced into the Portland cement, the homogenization is reached while employing a ultraturax apparatus (Heidolph R21R 2102 Control) with a first 1 minute 600 RPM regime and a final 1200 RPM regime is operated until the final pastes appear homogeneous by eyes (2 to 3 minutes for the volumes in use in this work). Finally, the native pastes are placed within Plexiglas cylinder molds with paraffin films at the two extremities, and immerged into Ca(OH)2 deionized water saturated solution for one week, prior being demolded.

Hereafter in this experiment the carboxymetylcellulose is labeled as CD, the Ketj en black carbon is labelled Ketj, the PBX 55 carbon is labeled PBX and the Vulcan XC72R is labeled W. Moreover, the synthesized carbon-cement nanocomposites are labeled hereafter [CDx(ketj-PBX—W)y(z)], where "x" refers to the CD weight percentage versus water, "y" refers to the carbon weight percentage versus water and "(z)" represents the water/cement weight ratios. When the deionized water is replaced by a KOH alkaline solution, final composite materials are labelled as followed: [CDx(ketj-PBX—W)y KOHwM(z)], where "w" emphasizes the solution molarity. When the carbon blacks are mixed, the materials are labeled: [CDx(ketjA-PBXB—WC)y(z)] where A, B, C represent the weight ratio of carbon Ketj, PBX, W versus the total carbon blacks.

Specific syntheses of Each Nanocomposite are Proposed Below:

CD1W1(0.43): 0.213 g of CD is dissolved into 21.53 g of deionized water. Upon dissolution completion 0.21 g of W is introduced and dispersed until reaching a shiny homogeneous ink. This ink is then mixed with 50 g of cement powder to form a homogenized paste, that is cast and stored as described in FIG. 5.

CD0.5W1 (0.43): 0.11 g of CD is dissolved into 21.53 g of deionized water. Upon dissolution completion 0.21 g of W is introduced and dispersed until reaching a shiny homogeneous ink. This ink is then mixed with 50 g of cement powder to form a homogenized paste, that is cast and stored as described in FIG. 5.

CD0.5W2(0.44): 0.117 g of CD is dissolved into 21.97 g of deionized water. Upon dissolution completion 0.415 g of W is introduced and dispersed until reaching a shiny homogeneous ink. This ink is then mixed with 50 g of cement powder to form a homogenized paste, that is cast and stored as described in FIG. 5.

CD0.5W3(0.42): 0.118 g of CD is dissolved into 21.09 g of deionized water. Upon dissolution completion 0.63 g of W is introduced and dispersed until reaching a shiny homogeneous ink. This ink is then mixed with 50 g of cement powder to form a homogenized paste, that is cast and stored as described in FIG. 5.

CD1ketj1(0.42): 0.209 g of CD is dissolved into 21.1 g of deionized water. Upon dissolution completion 0.217 g of Ketj is introduced and dispersed until reaching a shiny homogeneous ink. This ink is then mixed with 50 g of cement powder to form a homogenized paste, that is cast and stored as described in FIG. 5.

CD1Ketj2(0.43): 0.214 g of CD is dissolved into 21.44 g of deionized water. Upon dissolution completion 0.429 g of Ketj is introduced and dispersed until reaching a shiny homogeneous ink. This ink is then mixed with 50 g of cement powder to form a homogenized paste, that is cast and stored as described in FIG. 5.

CD1.5Ketj3(0.43): 0.328 g of CD is dissolved into 21.57 g of deionized water. Upon dissolution completion 0.64 g of Ketj is introduced and dispersed until reaching a shiny homogeneous ink. This ink is then mixed with 50 g of cement powder to form a homogenized paste, that is cast and stored as described in FIG. 5.

CD2Ketj3(0.43): 0.42 g of CD is dissolved into 21.34 g of deionized water. Upon dissolution completion 0.631 g of Ketj is introduced and dispersed until reaching a shiny homogeneous ink. This ink is then mixed with 50 g of cement powder to form a homogenized paste, that is cast and stored as described in FIG. 5.

CD2Ketj3KOH1M(0.43): 0.42 g of CD is dissolved into 21.32 g of KOH 1M solution. Upon dissolution completion 0.629 g of Ketj is introduced and dispersed until reaching a shiny homogeneous ink. This ink is then mixed with 50 g of cement powder to form a homogenized paste, that is cast and stored as described in FIG. 5.

CD0.5W3KOH1M(0.43): 0.117 g of CD is dissolved into 21.33 g of KOH 1M solution. Upon dissolution completion 0.631 g of W is introduced and dispersed until reaching a shiny homogeneous ink. This ink is then mixed with 50 g of cement powder to form a homogenized paste, that is cast and stored as described in FIG. 5.

CD2Ketj4(0.43): 0.42 g of CD is dissolved into 21.47 g of deionized water. Upon dissolution completion 0.84 g of Ketj is introduced and dispersed until reaching a shiny homogeneous ink. This ink is then mixed with 50 g of cement powder to form a homogenized paste, that is cast and stored as described in FIG. 5.

CD2Ketj3.4(0.43): 0.42 g of CD is dissolved into 21.49 g of deionized water. Upon dissolution completion 0.73 g of Ketj is introduced and dispersed until reaching a shiny homogeneous ink. This ink is then mixed with 50 g of cement powder to form a homogenized paste, that is cast and stored as described in FIG. 5.

CD1Ketj0.5(0.43): 0.21 g of CD is dissolved into 21.47 g of deionized water. Upon dissolution completion 0.107 g of Ketj is introduced and dispersed until reaching a shiny homogeneous ink. This ink is then mixed with 50 g of cement powder to form a homogenized paste, that is cast and stored as described in FIG. 5.

CD1.6W8(0.52): 0.42 of CD is dissolved into 26 g of deionized water. Upon dissolution completion 1.68 g of W is introduced and dispersed until reaching a shiny homogeneous ink. This ink is then mixed with 50 g of cement powder to form a homogenized paste, that is cast and stored as described in FIG. 5.

CD1.6W5(0.52): 0.42 g of CD is dissolved into 26 g of deionized water. Upon dissolution completion 1.26 g of W is introduced and dispersed until reaching a shiny homogeneous ink. This ink is then mixed with 50 g of cement powder to form a homogenized paste, that is cast and stored as described in FIG. 5.

CD1.6W6.4(0.52): 0.42 g of CD is dissolved into 26 g of deionized water. Upon dissolution completion 1.68 g of W is introduced and dispersed until reaching a shiny homogeneous ink. This ink is then mixed with 50 g of cement powder to form a homogenized paste, that is cast and stored as described in FIG. 5.

CD1.6Ketj8(0.51): 0.42 g of CD is dissolved into 25.5 g of deionized water. Upon dissolution completion 2.1 g of Ketj is introduced and dispersed until reaching a shiny homogeneous ink. This ink is then mixed with 50 g of cement powder to form a homogenized paste, that is cast and stored as described in FIG. 5.

CD1.5W9(0.6): 0.42 g of CD is dissolved into 28.9 g of deionized water. Upon dissolution completion 2.52 g of W is introduced and dispersed until reaching a shiny homogeneous ink. This ink is then mixed with 50 g of cement powder to form a homogenized paste, that is cast and stored as described in FIG. 5.

CD1.6W2(0.52): 0.42 g of CD is dissolved into 26 g of deionized water. Upon dissolution completion 0.415 g of W is introduced and dispersed until reaching a shiny homogeneous ink. This ink is then mixed with 50 g of cement powder to form a homogenized paste, that is cast and stored as described in FIG. 5.

CD0.8W5(0.52): 0.208 g of CD is dissolved into 26 g of deionized water. Upon dissolution completion 1.26 g of W is introduced and dispersed until reaching a shiny homogeneous ink. This ink is then mixed with 50 g of cement powder to form a homogenized paste, that is cast and stored as described in FIG. 5.

CD0.8W6(0.52): 0.208 g of CD is dissolved into 26 g of deionized water. Upon dissolution completion 1.68 g of W is introduced and dispersed until reaching a shiny homogeneous ink. This ink is then mixed with 50 g of cement powder to form a homogenized paste, that is cast and stored as described in FIG. 5.

CD2W4(0.6): 0.6 g of CD is dissolved into 30 g of deionized water. Upon dissolution completion 1.2 g of W is introduced and dispersed until reaching a shiny homogeneous ink. This ink is then mixed with 50 g of cement powder to form a homogenized paste, that is cast and stored as described in FIG. 5.

CD1.7W8(0.6): 0.72 g of CD is dissolved into 43 g of deionized water. Upon dissolution completion 3.6 g of W is introduced and dispersed until reaching a shiny homogeneous ink. This ink is then mixed with 71.5 g of cement powder to form a homogenized paste, that is cast and stored as described in FIG. 5.

CD1.7W8(0.8): 0.52 g of CD is dissolved into 30 g of deionized water. Upon dissolution completion 2.5 g of W is introduced and dispersed until reaching a shiny homogeneous ink. This ink is then mixed with 37.5 g of cement powder to form a homogenized paste, that is cast and stored as described in FIG. 5.

CD1.4PBX10(0.6): 0.42 g of CD is dissolved into 30 g of deionized water. Upon dissolution completion 3.0 g of PBX is introduced and dispersed until reaching a shiny homogeneous ink. This ink is then mixed with 50 g of cement powder to form a homogenized paste, that is cast and stored as described in FIG. 5.

CD1.4PBX10(0.8): 0.42 g of CD is dissolved into 30 g of deionized water. Upon dissolution completion 3.0 g of PBX is introduced and dispersed until reaching a shiny homogeneous ink. This ink is then mixed with 37.5 g of cement powder to form a homogenized paste, that is cast and stored as described in FIG. 5.

CD1.4PBX14(0.6): 0.42 g of CD is dissolved into 30 g of deionized water. Upon dissolution completion 4.15 g of PBX is introduced and dispersed until reaching a shiny homogeneous ink. This ink is then mixed with 50 g of cement powder to form a homogenized paste, that is cast and stored as described in FIG. 5.

CD1.7PBX14(0.8): 0.42 g of CD is dissolved into 30 g of deionized water. Upon dissolution completion 4.18 g of W is introduced and dispersed until reaching a shiny homogeneous ink. This ink is then mixed with 37.5 g of cement powder to form a homogenized paste, that is cast and stored as described in FIG. 5.

CD1.4(ketj0.2W0.8)12(0.6): 0.42 g of CD is dissolved into 30 g of deionized water. Upon dissolution completion 2.88 g of W and 0.72 g of ketj are introduced and dispersed until reaching a shiny homogeneous ink. This ink is then mixed with 50 g of cement powder to form a homogenized paste, that is cast and stored as described in FIG. 5.

CD1.4(ketj0.2W0.8)12(0.8): 0.42 g of CD is dissolved into 30 g of deionized water. Upon dissolution completion 2.88 g of W and 0.72 g of ketj are introduced and dispersed until reaching a shiny homogeneous ink. This ink is then mixed with 37.5 g of cement powder to form a homogenized paste, that is cast and stored as described in FIG. 5.

CD1.4W8(0.7): 0.42 g of CD is dissolved into 30 g of deionized water. Upon dissolution completion 2.5 g of W is introduced and dispersed until reaching a shiny homogeneous ink. This ink is then mixed with 42.86 g of cement powder to form a homogenized paste, that is cast and stored as described in FIG. 5.

CD1.4W8(0.65): 0.42 g of CD is dissolved into 30 g of deionized water. Upon dissolution completion 2.5 g of W is introduced and dispersed until reaching a shiny homogeneous ink. This ink is then mixed with 46.15 g of cement powder to form a homogenized paste, that is cast and stored as described in FIG. 5.

CD1.4W8(0.90): 0.42 g of CD is dissolved into 30 g of deionized water. Upon dissolution completion 2.5 g of W is introduced and dispersed until reaching a shiny homogeneous ink. This ink is then mixed with 33.33 g of cement powder to form a homogenized paste, that is cast and stored as described in FIG. 5.

CD1.4PBX18(0.8): 0.42 g of CD is dissolved into 30 g of deionized water. Upon dissolution completion 5.30 g of PBX is introduced and dispersed until reaching a shiny homogeneous ink. This ink is then mixed with 37.5 g of cement powder to form a homogenized paste, that is cast and stored as described in FIG. 5.

CD1.4PBX21.5(0.8): 0.42 g of CD is dissolved into 30 g of deionized water. Upon dissolution completion 6.15 g of PBX is introduced and dispersed until reaching a shiny homogeneous ink. This ink is then mixed with 37.5 g of cement powder to form a homogenized paste, that is cast and stored as described in FIG. 5.

CD1.4PBX2(0.8): 0.42 g of CD is dissolved into 30 g of deionized water. Upon dissolution completion 0.6 g of PBX is introduced and dispersed until reaching a shiny homogeneous ink. This ink is then mixed with 37.5 g of cement powder to form a homogenized paste, that is cast and stored as described in FIG. 5.

CD1.4PBX6(0.8): 0.42 g of CD is dissolved into 30 g of deionized water. Upon dissolution completion 1.8 g of PBX is introduced and dispersed until reaching a shiny homogeneous ink. This ink is then mixed with 37.5 g of cement powder to form a homogenized paste, that is cast and stored as described in FIG. 5.

CD1.4PBX8(0.8): 0.42 g of CD is dissolved into 30 g of deionized water. Upon dissolution completion 2.4 g of PBX is introduced and dispersed until reaching a shiny homogeneous ink. This ink is then mixed with 37.5 g of cement powder to form a homogenized paste, that is cast and stored as described in FIG. 5.

CD1.4PBX12(0.8): 0.42 g of CD is dissolved into 30 g of deionized water. Upon dissolution completion 3.6 g of PBX is introduced and dispersed until reaching a shiny homogeneous ink. This ink is then mixed with 37.5 g of cement powder to form a homogenized paste, that is cast and stored as described in FIG. 5.

CD1.4PBX16(0.8): 0.42 g of CD is dissolved into 30 g of deionized water. Upon dissolution completion 4.8 g of PBX is introduced and dispersed until reaching a shiny homogeneous ink. This ink is then mixed with 37.5 g of cement powder to form a homogenized paste, that is cast and stored as described in FIG. 5.

CD1.4PBX20(0.8): 0.42 g of CD is dissolved into 30 g of deionized water. Upon dissolution completion 6.0 g of PBX is introduced and dispersed until reaching a shiny homogeneous ink. This ink is then mixed with 37.5 g of cement powder to form a homogenized paste, that is cast and stored as described in FIG. 5.

Further Experiment #2: Electronic Transport Properties of Cement/Nanoporous Carbon Nanocomposites In a further experiment in accordance with an embodiment of the invention, there is first discussed the electrical conductivity properties of the cement/carbon-back composites (w/c=0.8) prepared with various concentrations in carbon black (PBX 55, Cabot) ranging between 0 and 8.12% wt. for a fixed cellulose content of 0.6% wt. Resistivity measurements were performed on cylindrical samples (thickness of about 0.8 cm and diameter of about 2 cm), which surfaces have been polished down to the micron scale. The samples are sandwiched between conductive graphite layers, each connected to a power source. A ramp of voltage from 5V to 0V is performed on each sample, which allows us to determine the composite conductivity using Ohm's Law and the exact geometric dimensions of each sample. For each sample, we measure the open circuit voltage before and after the voltage ramp to estimate the polarization of the sample induced by the ramp. Finally, for each sample, the electrical conductivity is measured first at ambient temperature and standard humidity level, and second after the sample has been dried at 60° C. during 2 weeks. The results are presented in FIG. 6.

Figure 6:
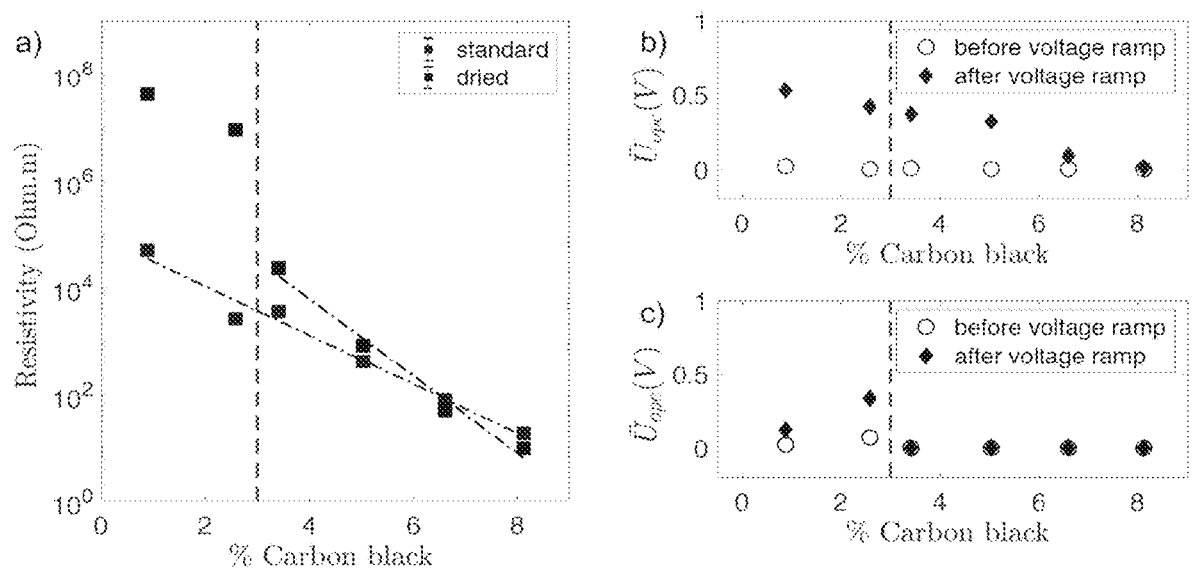
FIG. 6 shows resistivity of hardened cement paste/nanoporous carbon composites containing 0.6% wt. of carboxymethyl-cellulose and various amounts of nanoporous carbon nanoparticles ranging between 0 and 8% wt, in an experiment in accordance with an embodiment of the invention.

FIG. 6 shows resistivity of hardened cement paste/nanoporous carbon composites containing 0.6% wt. of carboxymethyl-cellulose and various amounts of nanoporous carbon nanoparticles ranging between 0 and 8% wt. (a) Resistivity of standard and dried composites. Standard composites display both ionic and electronic conduction, whereas the dried composites only display electronic conduction. The red dashed line highlights the critical carbon content above which dried composites are electronically conductive due to the presence of a percolated network of nanoporous carbon nanoparticles within the matrix of hardened cement paste. (b) Open circuit voltage $U_{opc}$ measured before and after the voltage ramp for standard composites vs nanoporous carbon content. $U_{opc}$ is larger after the voltage ramp, showing that the composite has been polarized by the voltage ramp. (c) $U_{opc}$ measured before and after the voltage ramp for dried composites vs nanoporous carbon content. Above the percolation threshold, $U_{opc}$ is identical before and after the voltage ram and equal to zero. Experiments performed on 30 day old samples.

Measuring the open circuit voltage of the cement/nanoporous carbon composites confirms the above finding. Indeed, open circuit voltage measurements performed on dried composites show that samples with content in nanoporous carbon nanoparticles larger than 3% wt. exhibit an open circuit voltage equal to zero both before and after the voltage ramp (FIG. 6C). This result strongly supports the idea that the composite contains a percolated network of nanoporous carbon particles spanning through the entire sample that allows any electronic polarization (pre-existing or induced by the voltage ramp) to relax quickly via electronic conduction. Note that the same composites considered in standard conditions (i.e. without being dried) display a negligible polarization before the voltage ramp, while they develop an open circuit voltage of about 0.5V after the ramp due to the presence of free water and ions (FIG. 6B). Such polarization effect vanishes for composites containing more than 8% wt. of nanoporous carbon nanoparticles, where the electrical conductivity due to the percolated network of nanoporous carbon nano-particles dominates the ionic conductivity. This result strongly suggests that the most promising composites for building electrodes are samples containing carbon in larger amount than 8% wt.

Figure 7:
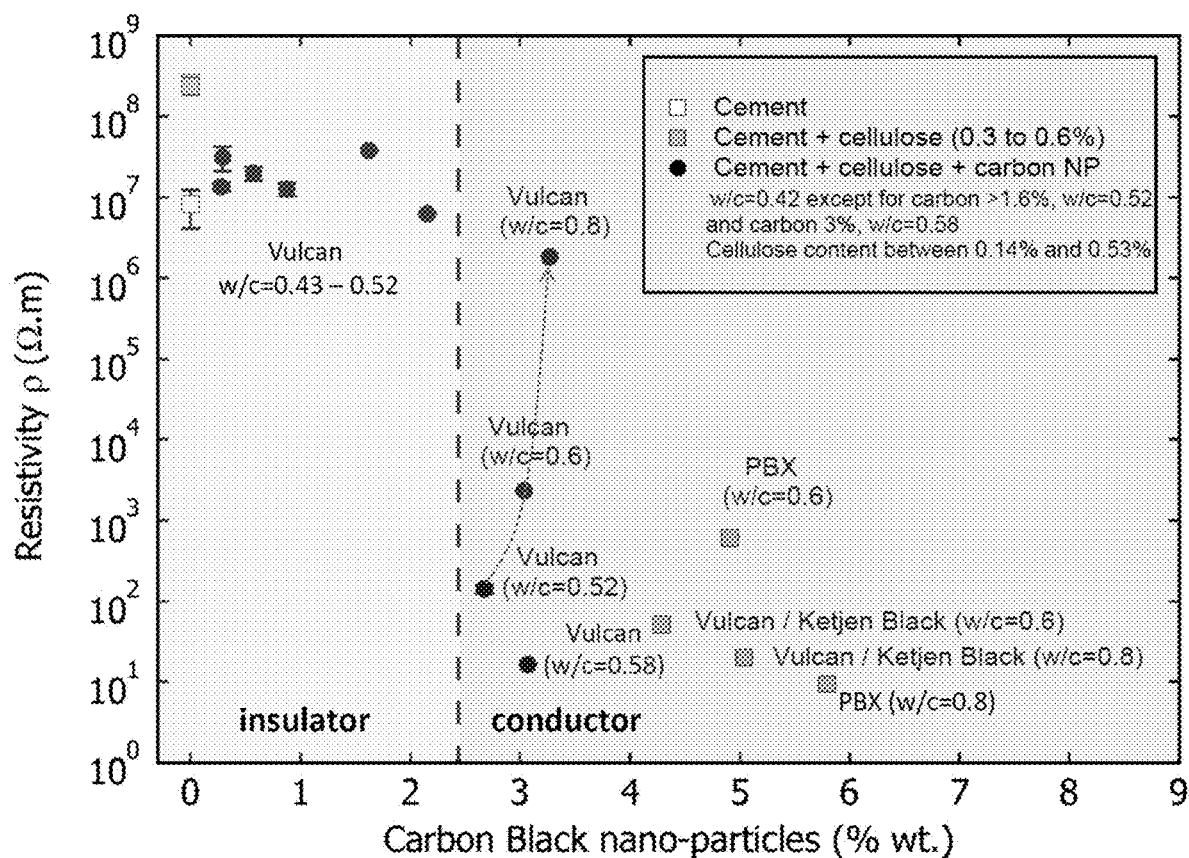
FIG. 7 shows the resistivity of a broad collection of composites prepared with various water to cement ratio (w/c), various amount of carboxymethyl-cellulose and various type and amounts of carbon nano-particles, in an experiment in accordance with an embodiment of the invention.

Finally, note that the existence of a critical concentration in nanoporous carbon nano-particles beyond which the composite is electrically conductive is reported here on samples prepared exclusively with one type of nanoporous carbon nanoparticles (i.e. PBX 55). Nonetheless, our results extend to other types of nanoporous carbon nanoparticles, as illustrated in FIG. 7 on Vulcan XC72R as well as Vulcan XC72R and Ketjenblack mixtures. The composite samples prepared (for w/c=0.52) with Vulcan XC72R nanoporous carbon particles show an insulator/conductor transition at about 2.5% wt. This value is lower than that reported for PBX 55 in FIG. 6, but one should keep in mind that the samples reported in FIGS. 6 and 7 were not prepared with the same water to cement ratio (w/c=0.8 and w/c=0.52 respectively). Therefore, the critical concentration in carbon particles to turn the composite into a conductive material depends on the water to cement ratio as illustrated in FIG. 7 in the case of the Vulcan XC72R (see blue symbols and dashed curves). A composite sample prepared with the Vulcan XC72R and a water to cement ratio of 0.58 is conductive, whereas a similar sample prepared with w/c=0.8 (with roughly every other parameter kept the same) is non-conductive.

This result strongly suggests that the insulator/conductor transition is moved to higher carbon content for larger water to cement ratio. Finally, note that composite samples prepared with sufficiently large amount of Vulcan XC72R, or mixtures of Vulcan XC72R and KetjenBlack or PBX also display a low resistivity, similarly to what was shown for composites prepared with PBX 55 as reported above in FIG. 6.

FIG. 7 shows the resistivity of a broad collection of composites prepared with various water to cement ratio (w/c), various amount of carboxymethyl-cellulose and various type and amounts of carbon nano-particles. All the measurements reported here were performed on non-polished samples dried at 60° C. for at least 1 week. Composite samples prepared with Vulcan XC72R show an insulator/conductor transition at about 2.5% wt. Experiments performed on samples of 30 days old at least.

Further Experiment #3: Mechanical Properties of Cement/Carbon Composites

In a further experiment in accordance with an embodiment of the invention, there is discussed the impact of both carboxymethyl-cellulose and nanoporous carbon nanoparticles on the mechanical properties of hardened cement paste at two different spatial scales: at the microscale (~20 μm) and at the nanoscale (~300 nm). In both cases, the linear and the non-linear mechanical properties, i.e. the indentation modulus M and the hardness H, and the creep modulus C are determined by statistical indentation. The data are analyzed following the methods developed by Oliver & Phaar to compute H and M, and that of Vandamme & Ulm for computing C. All the experiments were performed on a hardened cement paste with a water to cement ratio w/c=0.8 and a cellulose content of 0.6% wt. The nanoporous carbon used is PBX 55, which amount was varied between 0 and 8.12% wt.

Figure 8:
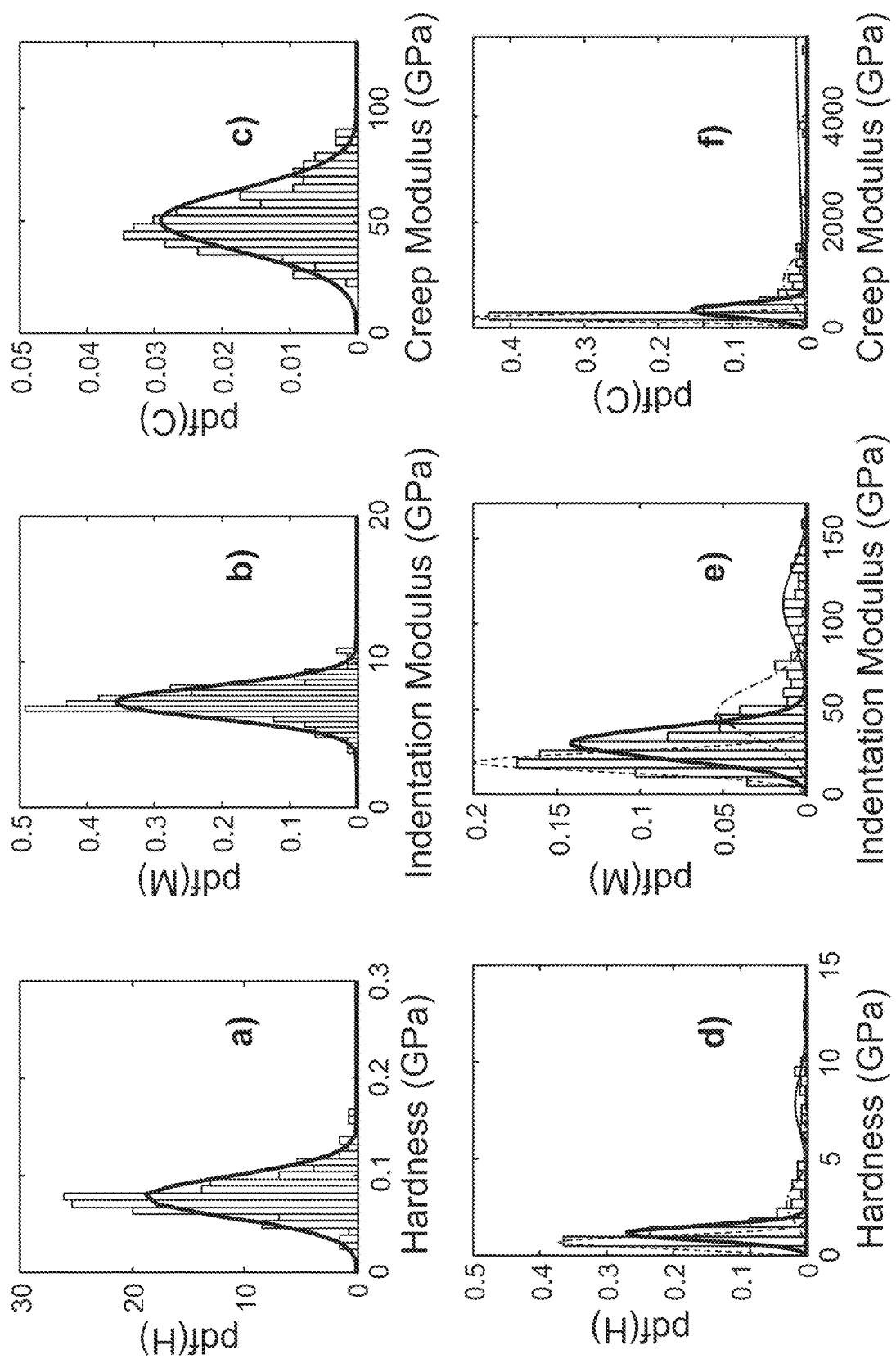
FIG. 8 shows mechanical properties of hardened cement paste, i.e. distribution of Hardness H, indentation modulus M and creep modulus C determined at the mesoscale (a) to (c) and at the microscale (d) to (f), in an experiment in accordance with an embodiment of the invention.

FIG. 8 shows mechanical properties of hardened cement paste, i.e. distribution of Hardness H, indentation modulus M and creep modulus C determined at the mesoscale (a) to (c) and at the microscale (d) to (f). Data reported in (a), (b) and (c) were obtained by performing 15×15=225 indents of typical depth 15 μm, and separated by 300 μm. Data reported in (d), (e) and (f) were obtained by performing 21×21=441 indents of typical depth 300 nm, and separated by 10 μm. Experiments performed on a sample of 30 days old.

Hardened cement paste alone displays homogeneous properties at the mesoscale, whereas it exhibits heterogeneous properties at the microscale. Indeed, H, M and C show a Gaussian distribution at the mesoscale (FIGS. 8A, 8B, and 8C) whereas H, M and C exhibit a more complex distribution at the microscale that can be fitted by 4 independent Gaussian distributions (FIGS. 8D, 8E and 8F). It has been shown in the literature that these 4 distributions correspond to the 4 phases from which hardened cement paste is made of.

These phases are respectively low-density CSH (Calcium Silica Hydrate), high density CSH, Calcium Hydroxyde and the clinker originally introduced and that display the strongest mechanical properties. These 4 phases form domains of spatial extension that is typically of a few microns, which is why these domains are not "visible" when performing indentation at the mesoscale. These results are used as a reference to determine the impact of cellulose and nanoporous carbon nanoparticles.

Figure 9:
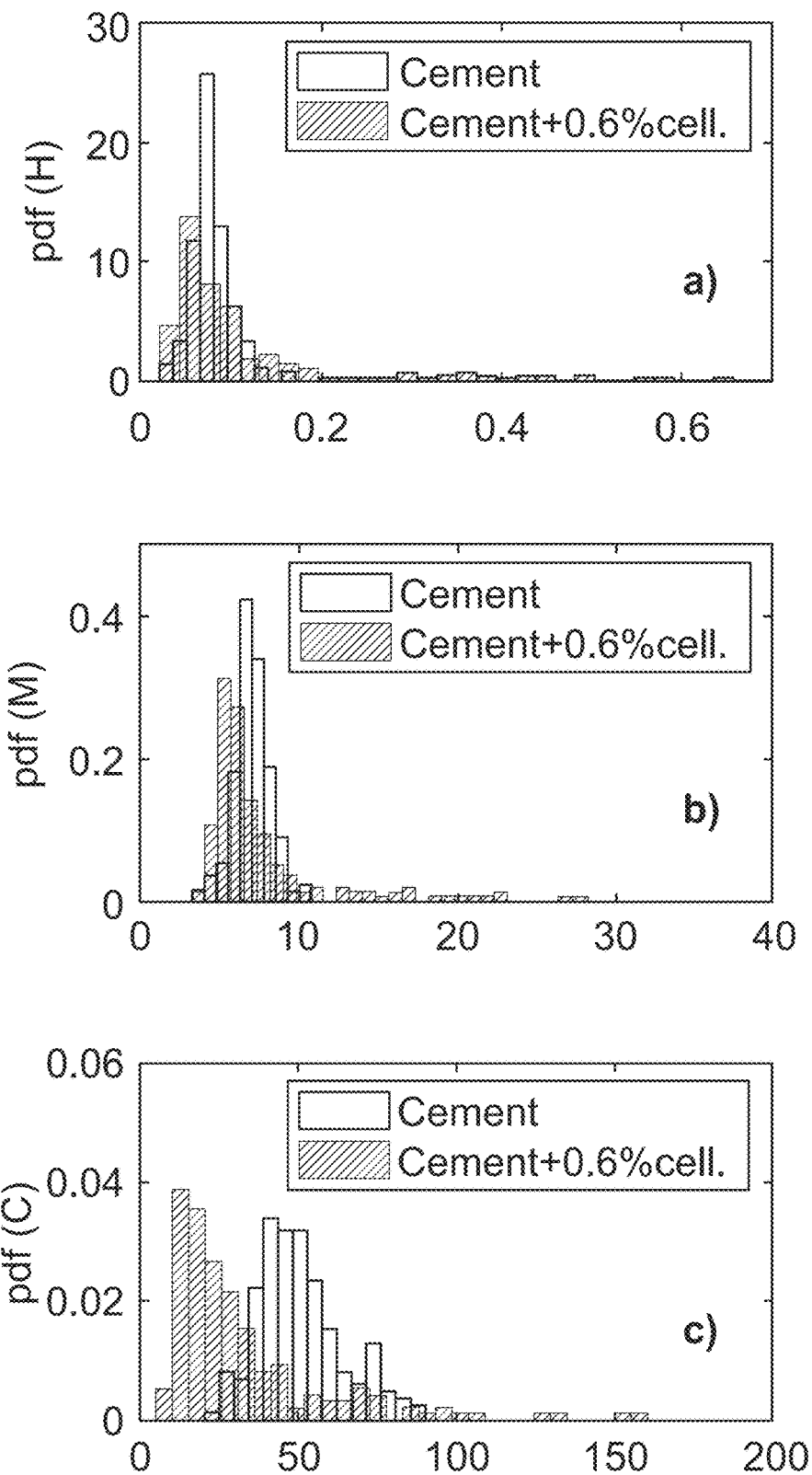
FIG. 9 shows distribution of H, M and C at the mesoscale for the reference hardened cement paste (same data as in FIG. 8) and for the cement paste/cellulose composite, in an experiment in accordance with an embodiment of the invention.

The addition of 0.6% wt. of carboxymethyl cellulose leads to a significant broadening of the distribution of H, M and C at the mesoscale. Moreover these distributions are no longer Gaussian (FIG. 9). FIG. 9 shows distribution of H, M and C at the mesoscale for the reference hardened cement paste (same data as in FIGS. 8A, 8B and 8C) and for the cement paste/cellulose composite. Data reported in (a), (b) and (c) were obtained by performing 15×15=225 indents of typical depth 15 μm, and separated by 300 μm. The presence of cellulose results in non-Gaussian distribution of broader extent. Experiments performed on a sample of 30 days old.

This result shows that cellulose has a significant impact on the hydration process of cement paste and strongly suggests that the phases composing the cement paste must have a greater spatial extent in presence of cellulose. Indeed, indentation at the microscale reveals that there are only 3 phases left: low density and high density CSH together with Calcium Hydroxyde (FIG. 6). The clinker has been completely consumed, which proves that the presence of cellulose strongly favors the hydration of cement. Moreover, the spatial extent of the two following phases: low density and high density CSH is indeed much larger in presence of cellulose, as illustrated in FIG. 6, where we can see that domains for both phases can be as large as 200 μm, which is consistent with the broadening of the distribution of H, M and C at the mesoscale.

Figure 10:
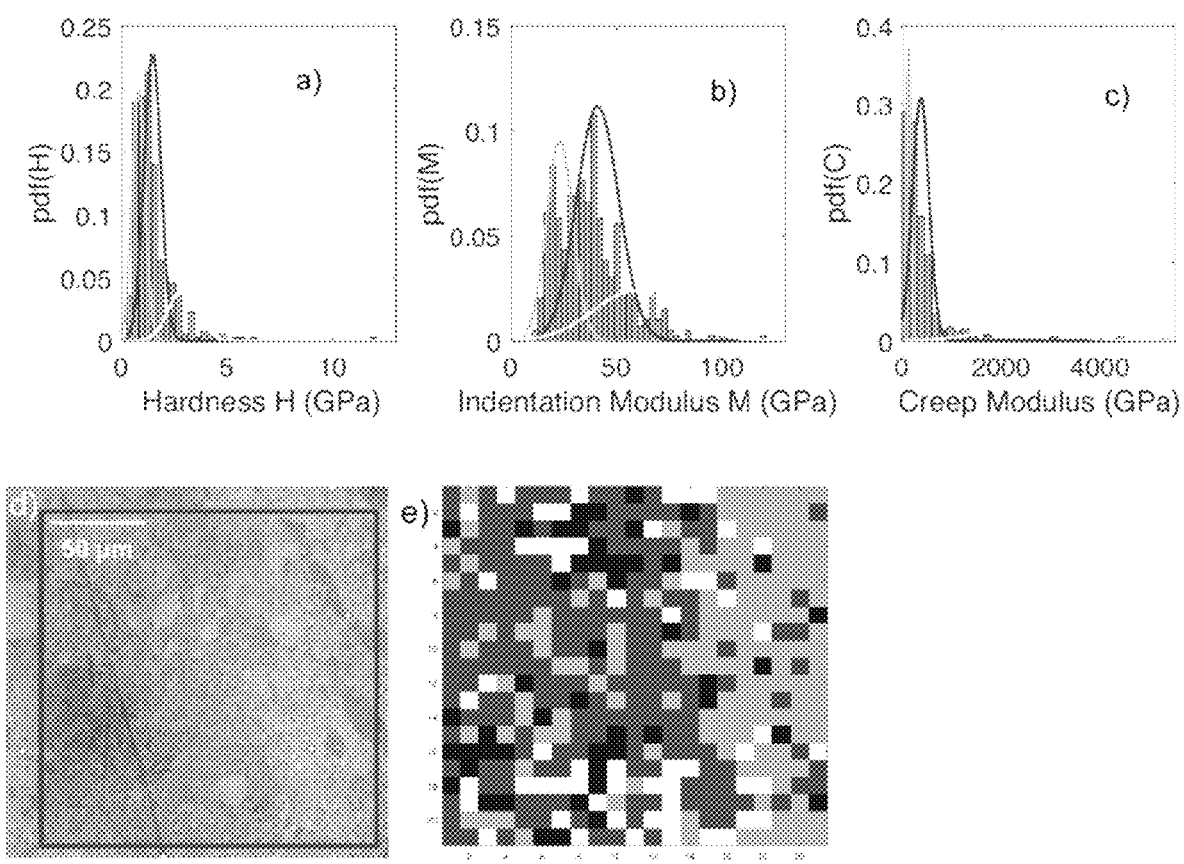
FIG. 10 shows distribution of H, M and C at the microscale for a cement/cellulose composite (a)-(c), in an experiment in accordance with an embodiment of the invention.

Finally, we shall emphasize that the presence of 0.6% wt. cellulose in the hardened cement paste poorly affects the most probable value of H and M both at the mesoscale (FIG. 9) and at the microscale (FIG. 10). However, the most probable value for the creep modulus decreases towards lower values at the mesoscale.

FIG. 10 shows distribution of H, M and C at the microscale for a cement/cellulose composite (a)-(c). Data reported in (a), (b) and (c) were obtained by performing 21×21=441 indents of typical depth 300 nm, and separated by 10 μm. The Gaussian fits of the data correspond to the three different phases composing the material: low density CSH (cyan), high density CSH (red) and calcium hydroxide (yellow). The total number of phases was determined by a Gaussian Mixture Modelling approach coupled to a Bayesian statistical criteria. An optical map of the indentation grid is pictured in (d), while the location of the three different phases are pictured in (e). Note that both low and high density CSH (cyan and red respectively) show domains of size comparable to the whole map, i.e. about 200 μm. Experiments performed on a sample of 30 days.

We now discuss the impact of nanoporous carbon nanoparticles on the mechanical properties of the composites. For samples of 30 days old, the presence of nanoporous carbon nanoparticles reinforces the mechanical properties of hardened cement paste (w/c=0.8) at the mesoscale. Indeed, H, M and C increases linearly with the amount of nanoporous carbon nanoparticles. Similarly, the fracture toughness of the composite, which is measured by scratch tests, also increases linearly with the amount of nanoporous carbon nanoparticles (FIG. 11).

Figure 11:
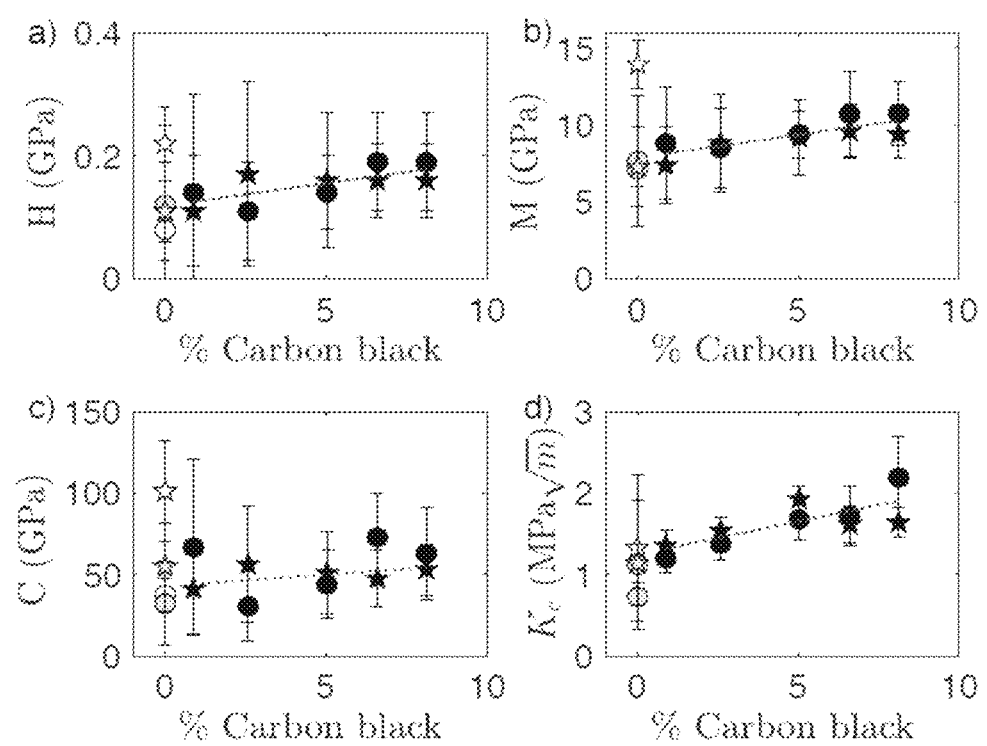
FIG. 11 shows evolution at the mesoscale of the mechanical properties of cement/carbon composites vs the amount of carbon, in an experiment in accordance with an embodiment of the invention.

FIG. 11 shows evolution at the mesoscale of the mechanical properties of cement/carbon composites vs the amount of carbon. (a) Hardness H, (b) Indentation modulus M, (c) Creep modulus C, (d) Fracture toughness $K_c$ vs nanoporous carbon nanoparticles content. Symbols encode the sample age: bullets=30 days, and stars=60 days. Colors encode the composition of the sample: white=hardened cement paste, gray=hardened cement paste and cellulose, black=hardened cement paste+cellulose+nanoporous carbon. The error bars stand for the width of the distributions of each quantity of interest. The red dashed line corresponds to the best linear fit of the data.

At 60 days, the mechanical properties of the composites are identical to that of 30 days. In contrast, the sole hardened cement paste shows improved mechanical properties at 60 days compared to 30 days, except for the fracture toughness, which keeps the same value. The key difference between the composite and the hardened cement paste results from the presence of the cellulose, which foster the hydration of the cement. The composite samples exhaust the reactive cement paste faster than the pure cement paste, whose properties keep evolving beyond 30 days. This effect is only linked to the presence of cellulose and, as a key result, the presence of carbon nanoparticles within the matrix of hardened cement paste does not degrade the mechanical properties of hardened cement paste. Our results prove that the addition of carbon nanoparticles does not weaken the mechanical properties of hardened cement paste, including beyond the critical value of 3% for which the carbon particles form a percolated network within the matrix of hardened cement paste.

Figure 12:
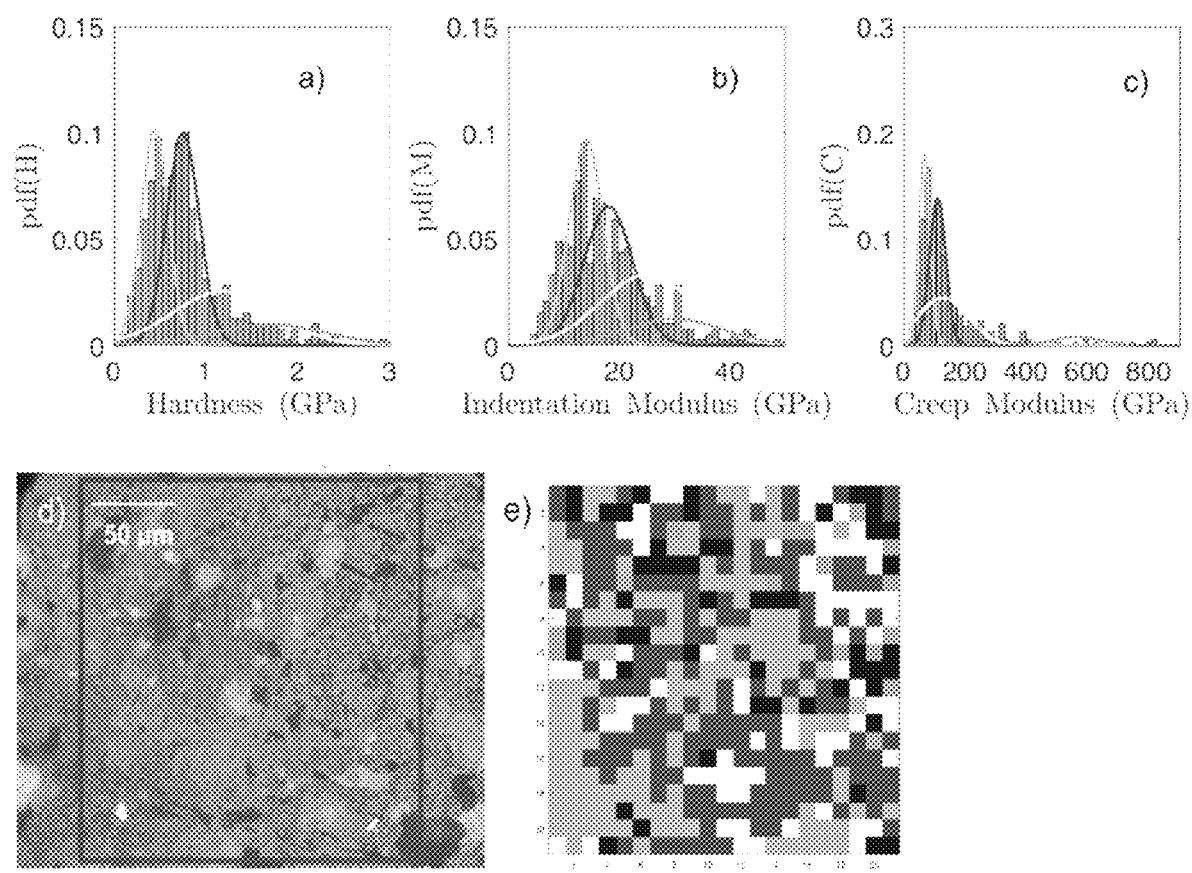
FIG. 12 shows distribution of H, M and C at the microscale for a composite with 0.6% wt. cellulose and 5% wt carbon (a)-(c), in an experiment in accordance with an embodiment of the invention.

As a last series of tests, we have determined the mechanical properties of the composites at the microscale. In agreement with the results reported in FIG. 10 and obtained on the hardened cement paste in presence of cellulose, we observe that there is no clinker left in the composites and that the sample composition is dominated by low density CSH, high density CSH and calcium hydroxide (FIG. 12). However, the Gaussian Mixture Modelling of the data coupled to a Bayesian information criteria reveals the presence of a fourth phase, which we interpret as the carbon nanoparticles, given the values of H, M and C for this fourth phase. Interestingly, the indentation grid reveals that the carbon nano-particles are well-dispersed within the sample (FIG. 12E). In conclusion to the section on mechanical properties, we have shown that the presence of cellulose fosters the hydration of the cement paste and leads to the complete consumption of the clinker initially present. The cellulose mainly speeds up the hydration process, while poorly impacting at the mesoscale the hardness and the indentation modulus of the resulting material. The presence of nanoporous carbon nano-particles reinforces the overall mechanical properties of the hardened cement paste, which increases linearly with increasing carbon content. The existence of a sample-spanning percolated network beyond 3% wt. of nanoporous carbon nanoparticles does not impact the mechanical properties of the composite, which proves that these electrically conductive composites can be used in the design of a structural supercapacitor.

FIG. 12 shows distribution of H, M and C at the microscale for a composite with 0.6% wt. cellulose and 5% wt carbon (a)-(c). Data reported in (a), (b) and (c) were obtained by performing 21×21=441 indents of typical depth 300 nm, and separated by 10 μm. The Gaussian fits of the data correspond to the four different phases composing the material: low density CSH (cyan), high density CSH (red), calcium hydroxide (yellow) and carbon (green). The total number of phases was determined by a Gaussian Mixture Modelling approach coupled to a Bayesian statistical criteria. An optical map of the indentation grid is pictured in (d), while the location of the four different phases are pictured in (e). Note that the nanoporous carbon nanoparticles are well dispersed and localized in the vicinity of the calcium hydroxide. Experiments performed on a sample of 30 days old.

Figure 13:
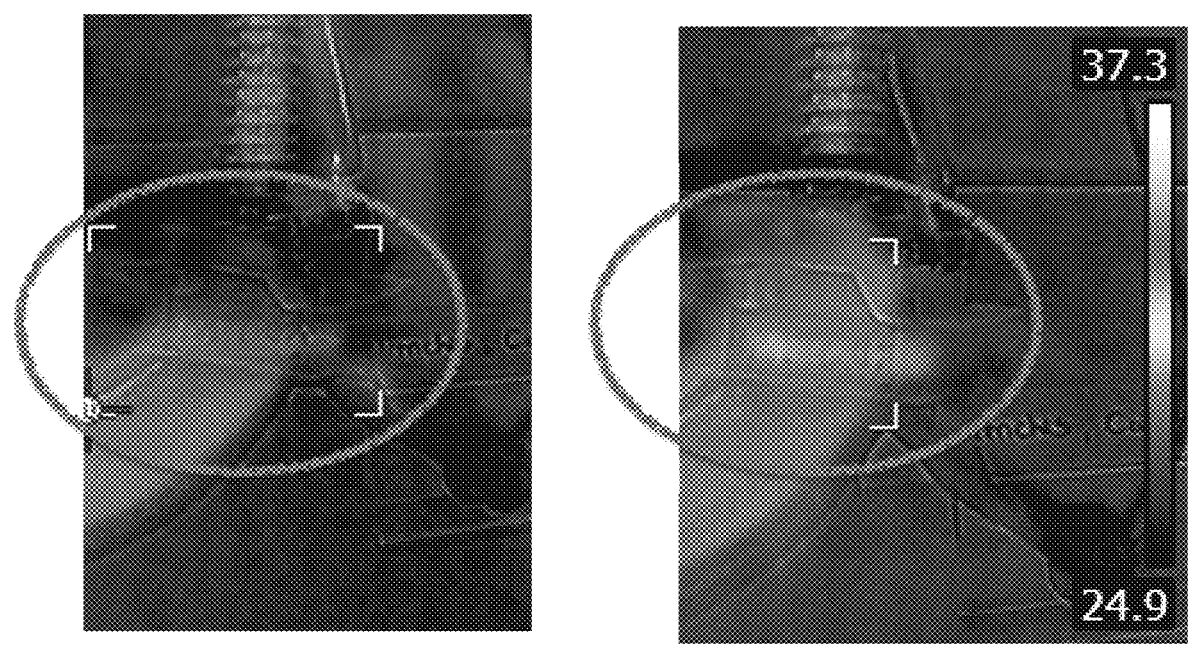
FIG. 13 shows surface temperature increase of a cellulose +5% wt carbon sample under 30 V (DC), in an experiment in accordance with an embodiment of the invention.

Further Experiment #4: Heat Transport Properties of Cement/Nanoporous Carbon Composites In a further experiment in accordance with an embodiment of the invention, by polarizing a 1 cm$^3$ sample of one of our electron-conducting cement/nanoporous carbon composites with 30 V (direct current, 1 A), we obtained an immediate increase of sample's external surface temperature by 5 C. as shown in FIG. 13. FIG. 13 shows surface temperature increase of a cellulose +5% wt carbon sample under 30 V (DC). This shows that a possible application of an embodiment of the invention as a solution to prevent freeze-thaw of pavements if a thin (centimeter thick) layer of our cement/carbon nanocomposite were to be deposited on pavement slab and connected to an external source of electric current (that could be from solar panels for instance). Another application will be in the field of construction where an embodiment of the invention can be used to protect basement walls for instance from capillary (water) rise.

Further Experiment #5: Supercapacitor in Cement/Nanoporous Carbon Composites

Figure 14:
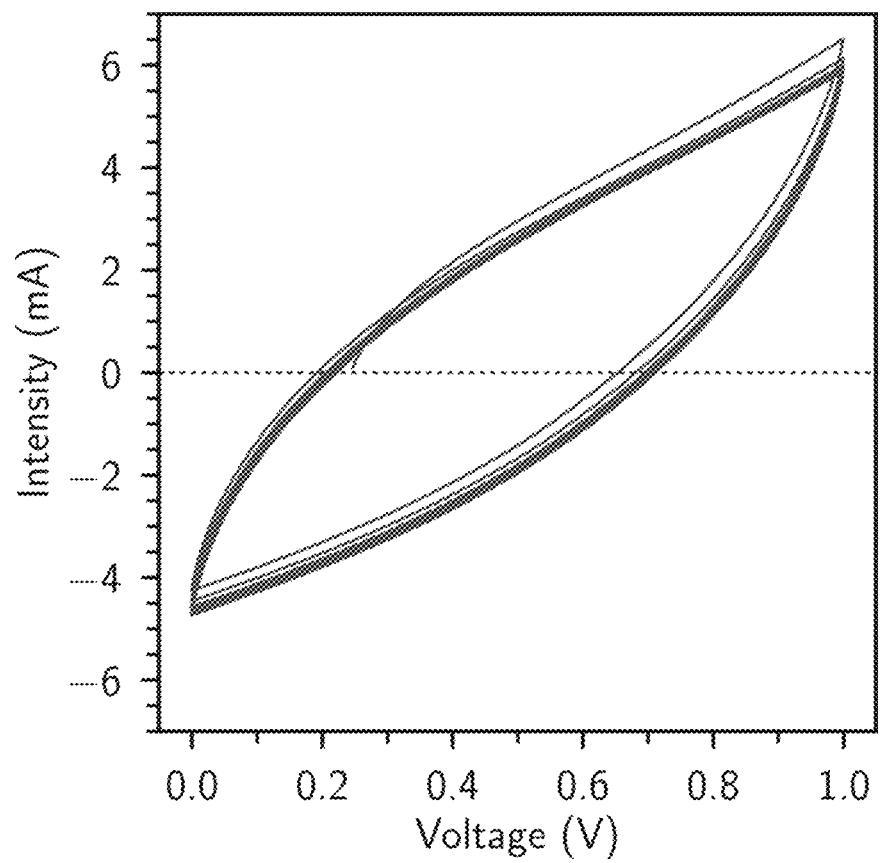
FIG. 14 shows the capacitor effect (as obtained from cyclic voltammetry experiment, CV) with KCl 1 M as electrolyte, in an experiment in accordance with an embodiment of the invention.

Cement/nanoporous carbon nano-composites also have the ability to transform a cement paste into an electrical energy storage device such as a structural supercapacitor turning cement from mere building material into an electrical energy storage structural element device. An embodiment according to the invention comprises a structural supercapacitor based on the cement and nanoporous carbon composites taught herein, that will be optimized for their capacitance and structural performance under the form of a self-standing rigid electrodes system. A structural supercapacitor generally requires at least two multifunctional components: a structural electrode with high and ionically accessible surface area and good electronic conductivity. This is the case of the nanoporous carbon/cement composites of an embodiment, which in addition demonstrate with no loss of mechanical properties. FIG. 14 shows the capacitor effect (as obtained from cyclic voltammetry experiment, CV) with KCl 1M as electrolyte. Our cement nanoporous carbon composite allows charge-discharge cycling. In FIG. 14, there are shown cyclic voltammetry measurements on the sample CD1.4PBX20(0.8): 0.42 g of CD is dissolved into 30 g of deionized water. Upon dissolution completion 6.0 g of PBX is introduced and dispersed until reaching a shiny homogeneous ink. This ink is then introduced into 37.5 g of cement and homogenized, molded and stored as described in FIG. 5.

An embodiment can be optimized in all aspects ranging from the choice and concentration of the electrolyte (for example, water, acetonitrile solvent and ionic species, such as alkali, ionic liquids) to the amount and type of nanoporous carbons, dispersant (for example cellulose based polymers) to the initial water/cement binder ratio. The percolating phase of nanoporous carbon nanograins dispersed in a cement paste can potentially have a large absolute capacitance given the size of structural elements used in the built infrastructure. It can be also used as battery.

REFERENCES (1) Brunauer, S., Emmett, P. H., & Teller, E. (1938). Adsorption of gases in multimolecular layers. *Journal of the American Chemical Society*, 60(2), 309-319.

(2) Barrett, E. P., Joyner, L. G., & Halenda, P. P. (1951). The determination of pore volume and area distributions in porous substances. I. Computations from nitrogen isotherms. *Journal of the American Chemical Society*, 73(1), 373-380.

(3) Oliver, W.C., & Pharr, G. M. (1992). An improved technique for determining hardness and elastic modulus using load and displacement sensing indentation experiments. *Journal of Materials Research,* 7, Cambridge Univ. Press 6, 1564-1583.

(4) Oliver, W.C., Pharr, G. M., & Teller, E. (2004). Measurement of hardness and elastic modulus by instrumented indentation: Advances in understanding and refinements to methodology. *Journal of Materials Research*, Cambridge Univ. Press 19, 3-20.

(5) Vandamme, M., Ulm, F.-J., & Teller, E. (2009). Nanogranular origin of concrete creep. *Proceedings of the National Academy of Sciences,* 26, 10552-10557.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An electrically conductive cement composite, comprising:
   hydraulic cement;
   water;
   a carbon nanoparticle dispersing agent; and
   a continuous percolating network of nanoporous carbon nanoparticles within a capillary pore network of the hydraulic cement.

2. The electrically conductive cement composite of claim 1, comprising between about 1% by weight and about 8% by weight of the nanoporous carbon nanoparticles.

3. The electrically conductive cement composite of claim 1, wherein the carbon nanoparticle dispersing agent comprises carboxymethyl cellulose.

4. The electrically conductive cement composite of claim 3, wherein the carboxymethyl cellulose comprises between about 0.1% by weight and about 1% by weight of a total initial mix comprising the hydraulic cement, the carbon nanoparticle dispersing agent, the water and the nanoporous carbon nanoparticles.

5. The electrically conductive cement composite of claim 1, wherein the nanoporous carbon nanoparticles comprise a pore size of less than about 1 nanometer.

6. The electrically conductive cement composite of claim 1, wherein the nanoporous carbon nanoparticles comprise carbon black and an activated porous carbon.

7. The electrically conductive cement composite of claim 1, wherein the hydraulic cement comprises Portland Cement.

8. The electrically conductive cement composite of claim 7, comprising between about 50% by weight and about 70% by weight of Portland Cement with respect to a total initial mix comprising the hydraulic cement, the carbon nanoparticle dispersing agent, the water and the nanoporous carbon nanoparticles.

9. The electrically conductive cement composite of claim 1, having an electrical resistivity of less than about 1000 ohm-meters.

10. The electrically conductive cement composite of claim 1, wherein the continuous percolating network of nanoporous carbon nanoparticles substantially fills a capillary pore network of the electrically conductive cement composite, the capillary pore network comprising pores between about 5 nanometers and about 1 micron in size.

11. The electrically conductive cement composite of claim 1, wherein the electrically conductive cement composite comprises a greater than 90 percent connected percolating pore network that hosts the nanoporous carbon nanoparticles which form the continuous percolating network of nanoporous carbon nanoparticles.

12. The electrically conductive cement composite of claim 1, wherein the nanoporous carbon nanoparticles have a BET surface area less than about 3000 $m^2/g$.

13. The electrically conductive cement composite of claim 1, comprising between about 0.1% by weight and about 1% by weight of the carbon nanoparticle dispersing agent with respect to a total initial mix comprising the hydraulic cement, the carbon nanoparticle dispersing agent, the water and the nanoporous carbon nanoparticles.

14. An electrically conductive mortar comprising the electrically conductive composite of claim 1 and fine aggregate.

15. An electrically conductive concrete comprising the electrically conductive composite of claim 1
   sand; and
   gravel aggregates.

16. A joule effect heated monolith structure comprising the electrically conductive composite of claim 1, and further comprising at least two terminals configured to receive application of an electrical potential difference between the at least two terminals, thereby producing heating in the electrically conductive cement composite.

17. At least one of a home basement wall or floor, a pavement, a road, and an airport runway comprising the electrically conductive composite of claim 16.

18. A concrete resistant to crystallization induced degradations comprising the electrically conductive composite of claim 1, and further comprising at least two terminals configured to receive application of an electrical potential difference between the at least two terminals.

19. A conductive cable, wire or concrete trance comprising the electrically conductive composite of claim 1.

* * * * *

UNITED STATES PATENT AND TRADEMARK OFFICE
CERTIFICATE OF CORRECTION

| | | |
|---|---|---|
| PATENT NO. | : 11,512,022 B2 | Page 1 of 1 |
| APPLICATION NO. | : 17/113745 | |
| DATED | : November 29, 2022 | |
| INVENTOR(S) | : Pellenq et al. | |

It is certified that error appears in the above-identified patent and that said Letters Patent is hereby corrected as shown below:

In the Claims

Claim 15, Column 24, Line 32, after "claim 1", please add --;--

Signed and Sealed this
Seventeenth Day of January, 2023

Katherine Kelly Vidal
*Director of the United States Patent and Trademark Office*